(12) United States Patent
Dosluoglu

(10) Patent No.: US 8,582,011 B2
(45) Date of Patent: Nov. 12, 2013

(54) SIMULTANEOUS GLOBAL SHUTTER AND CORRELATED DOUBLE SAMPLING READ OUT IN MULTIPLE PHOTOSENSOR PIXELS

(75) Inventor: Taner Dosluoglu, New York, NY (US)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 0 days.

(21) Appl. No.: 13/403,862

(22) Filed: Feb. 23, 2012

(65) Prior Publication Data
US 2012/0154648 A1 Jun. 21, 2012

Related U.S. Application Data

(63) Continuation of application No. 11/998,126, filed on Nov. 28, 2007, now Pat. No. 8,184,190.

(60) Provisional application No. 60/861,389, filed on Nov. 28, 2006.

(51) Int. Cl.
H04N 3/14 (2006.01)
H04N 5/335 (2011.01)

(52) U.S. Cl.
USPC .............................. 348/308; 348/296; 348/310

(58) Field of Classification Search
USPC .......................................... 348/296, 308, 310
See application file for complete search history.

(56) References Cited

U.S. PATENT DOCUMENTS

| 3,971,065 A | 7/1976 | Bayer |
| 4,011,016 A | 3/1977 | Layne et al. |
| 4,309,604 A | 1/1982 | Yoshikawa et al. |
| 4,613,895 A | 9/1986 | Burkey et al. |
| 5,028,970 A | 7/1991 | Masatoshi |
| 5,703,642 A | 12/1997 | Stevens |
| 5,898,168 A | 4/1999 | Gowda et al. |
| 5,962,906 A | 10/1999 | Liu |
| 5,965,875 A | 10/1999 | Merrill |
| 5,999,279 A | 12/1999 | Kouzaki et al. |

(Continued)

FOREIGN PATENT DOCUMENTS

| EP | 949 689 | 10/1999 |
| WO | 0062350 | 10/2000 |

OTHER PUBLICATIONS

Findlater et al. "A CMOS Imge Sensor With a Double-Junction Active Pixel", ; IEEE Trns-on Electron Devices, vol. 50, No. 1, Jan. 2003, pp. 32-42.

(Continued)

Primary Examiner — Ngoc-Yen Vu
(74) Attorney, Agent, or Firm — Stolowitz Ford Cower LLP

(57) ABSTRACT

An apparatus controls operation of an array of color multiple sensor pixel image sensors to provide a global shuttering for one half of the color multiple sensor pixel image sensors and a rolling shuttering for all color multiple sensor pixel image sensors of the array. The apparatus includes a row control circuit and a column clamp, sample, and hold circuit. The row control circuit generates the necessary reset control signals, transfer gating signals, and row selecting signals for providing the global shuttering and the rolling shuttering color multiple sensor pixel image sensors. The column clamp, sample and hold circuit generates an output signal representative of a number of photons impinging upon each color multiple sensor pixel image sensor of the row of selected color multiple sensor pixel image sensors. The control apparatus further includes an analog to digital converter which converts the read out signal to a digital image signal.

22 Claims, 11 Drawing Sheets

(56) References Cited

U.S. PATENT DOCUMENTS

| | | | |
|---|---|---|---|
| 6,107,655 | A | 8/2000 | Guidash |
| 6,111,300 | A | 8/2000 | Cao et al. |
| 6,130,466 | A | 10/2000 | Schneider et al. |
| 6,137,100 | A | 10/2000 | Fossum et al. |
| 6,150,683 | A | 11/2000 | Merrill |
| 6,359,323 | B1 | 3/2002 | Eom et al. |
| 6,417,950 | B1 | 7/2002 | Cathey, Jr. |
| 6,455,833 | B1 | 9/2002 | Berezin |
| 6,486,911 | B1 | 11/2002 | Denyer et al. |
| 6,667,768 | B1 | 12/2003 | Fossum et al. |
| 6,693,670 | B1 | 2/2004 | Stark |
| 6,714,239 | B2 | 3/2004 | Guidash |
| 6,809,766 | B1 | 10/2004 | Krymski et al. |
| 6,903,754 | B2 | 6/2005 | Brown-Elliott |
| 7,087,883 | B2 | 8/2006 | He et al. |
| 7,105,793 | B2 | 9/2006 | Rhodes |
| 7,113,213 | B2 * | 9/2006 | Matsunaga et al. ............ 348/308 |
| 7,176,544 | B2 | 2/2007 | Dosluoglu et al. |
| 7,244,918 | B2 | 7/2007 | McKee et al. |
| 7,414,233 | B2 | 8/2008 | Asaba |
| 7,427,734 | B2 | 9/2008 | Yang et al. |
| 7,611,060 | B2 * | 11/2009 | Wang et al. ............... 235/462.23 |
| 7,956,915 | B2 * | 6/2011 | Gomi ............................. 348/308 |
| 8,488,035 | B2 * | 7/2013 | Kondo et al. ................. 348/308 |
| 2005/0051702 | A1 | 3/2005 | Hong et al. |
| 2006/0192873 | A1 * | 8/2006 | Yaffe ............................ 348/297 |
| 2006/0202038 | A1 | 9/2006 | Wang |
| 2006/0203110 | A1 * | 9/2006 | Lim .............................. 348/241 |
| 2006/0256221 | A1 | 11/2006 | McKee et al. |
| 2007/0040922 | A1 | 2/2007 | McKee et al. |
| 2007/0084986 | A1 | 4/2007 | Yang |
| 2008/0002043 | A1 | 1/2008 | Inoue et al. |
| 2008/0079830 | A1 * | 4/2008 | Lepage ......................... 348/295 |
| 2008/0170848 | A1 | 7/2008 | Wernersson |
| 2010/0309340 | A1 * | 12/2010 | Border et al. ................. 348/241 |

OTHER PUBLICATIONS

UDT Sensors, Inc.; "Photodiode Characteristics and Applications", Product Catalog 2003, Hawhtorne, CA 90250, found www.udt.com Sep. 5, 2005.

Wany et al. "CMOS Image Sensor with NMOS-Only Global Shutter and Enhanced Responsivity"; IEEE Trans. On Electron devices, Vl 50, No. 1 Jan. 2003, pp. 57-62.

Schanz et al. "A High-Dynamic-range CMOS Image Sensor for Automotive Applications", IEEE Journal of Solid-State Circuits, vol. 35, No. 7 Jul. 2000, pp. 932-938.

Stolowitz Ford Cowger LLP; Related Case Listing Feb. 23, 2012; 1 page.

* cited by examiner

GLOBAL SHUTTER COLUMN SAMPLE, HOLD, AND READOUT CKT

SIMULTANEOUS GLOBAL SHUTTER AND CORRELATED DOUBLE SAMPLING READ OUT IN MULTIPLE PHOTOSENSOR PIXELS

RELATED PATENT APPLICATIONS

This application is a continuation of U.S. patent application Ser. No. 11/998,126, filed Nov. 28, 2007, now issued as 8,184,190 which claims priority under 35 U.S.C. §119 to U.S. Provisional Patent Application Ser. No. 60/861,389, filed Nov. 28, 2006, which is herein incorporated by reference in its entirety.

This application is also related to U.S. patent application Ser. No. 11/252,840, filed Oct. 18, 2005, assigned to the same assignee as this invention and incorporated herein by reference in its entirety.

BACKGROUND OF THE INVENTION

1. Field of the Invention

The present invention relates to solid-state image sensing devices. More particularly, this invention relates to apparatus and methods that generate signals for activating and controlling operation of multiple photosensor solid state image sensing devices.

2. Description of Related Art

Integrated circuit image sensors are finding applications in a wide variety of fields, including medical endoscopy, machine vision, robotics, guidance and navigation, automotive applications, and consumer products such as digital camera and video recorders. Imaging circuits typically include a two dimensional array of photo sensors. Each picture element (pixel) of the image includes at least one photo sensor. Light energy emitted or reflected from an object impinges upon the array of photo sensors. The light energy is converted by the photo sensors to an electrical signal. Imaging circuitry scans the individual photo sensors to read out the electrical signals. The electrical signals of the image are processed by external circuitry for subsequent display.

Modern metal oxide semiconductor (MOS) design and processing techniques have been developed that provide for the capture of light as charge and the transporting of that charge within active pixel sensors and other structures so as to be accomplished with almost perfect efficiency and accuracy.

One class of solid-state image sensors includes an array of active pixel sensors (APS). An APS is a light sensing device with sensing circuitry inside each pixel. Each active pixel sensor includes a sensing element formed in a semiconductor substrate and capable of converting photons of light into electronic signals. As the photons of light strike the surface of a photoactive region of the solid-state image sensors, free charge carriers are generated and collected. Once collected the charge carriers, often referred to as charge packets or photoelectrons, are transferred to output circuitry for processing.

An active pixel sensor also includes one or more active transistors within the pixel itself. The active transistors amplify and buffer the signals generated by the light sensing element to convert the photoelectron to an electronic signal prior to transferring the signal to a common conductor that conducts the signals to an output node.

Active pixel sensor devices are fabricated using processes that are consistent with complementary metal oxide semiconductor (CMOS) processes. Using standard CMOS processes allows many signal processing functions and operation controls to be integrated with an array of active pixel sensors on a single integrated circuit chip.

Active pixel sensor devices generally include at least one active transistor that is used to reset or clear the devices of charge from a previous image before the capturing the next image. In the rolling shutter operation, as described in U.S. Pat. No. 6,809,766 (Krymski, et al.), each row of active pixel sensors of the array is reset to clear the charge from the sensor and optionally a storage node of the device. The row is then exposed to light impinging upon the array for an integration time and then read out to convert the photoelectrons to the image data for the row.

Alternately, in a global shutter, as shown in U.S. Pat. No. 6,667,768 (Fossum), all rows of active pixel sensors of the array are reset to clear the charge from the sensor and optionally a storage node of the device. The row is then exposed to light impinging upon the array for an integration time. Each row is then read out to convert the photoelectrons to the image data for the row.

"A CMOS Image Sensor with a Double-Junction Active Pixel", Findlater, et al., IEEE Transactions on Electron Devices, January 2003, Vol.: 50, Issue: 1, pp: 32-42 describes a CMOS image sensor that employs a vertically integrated double-junction photodiode structure. This allows color imaging with only two filters. The sensor uses a 6-transistor pixel array.

"CMOS Image Sensor with NMOS-Only Global Shutter and Enhanced Responsivity", Wany, et al., IEEE Transactions on Electron Devices, January 2003, Vol.: 50, Issue: 1, pp: 57-62, provides an NMOS-only pixel with a global shutter and subthreshold operation of the NMOS sample-and-hold transistor to increase optical responsivity.

"A High-Dynamic-Range CMOS Image Sensor for Automotive Applications, Schanz, et al., IEEE Journal of Solid-State Circuits, July 2000, Vol: 35, Issue: 7, pp: 932-938 describes a CMOS imager that uses a combination of a multiexposure and a multigain linear read out.

U.S. Pat. No. 6,107,655 (Guidash) illustrates an image sensor having an array of pixels with at least two row adjacent pixels and at least two column adjacent pixels. At least one electrical function is integrated within the adjacent pixels and is shared between the adjacent pixels. The electrical function can be either a contact region or an electrical circuit used in implementing either a photogate, a transfer gate, a reset gate, a row select gate, an amplifier drain, an output node, a floating diffusion contact, a reset drain, a lateral overflow gate, an overflow drain or an amplifier.

SUMMARY OF THE INVENTION

An object of this invention is to provide an apparatus for controlling operation of an array of color multiple sensor pixel image sensors that sense light impinging upon the array of the multiple photosensor pixel image sensors.

Another object of this invention is to provide an apparatus for manipulating the controls of each color multiple sensor pixel image sensor of an array of color multiple sensor pixel image sensors to provide a global shutter for the array of color multiple sensor pixel image sensors.

Further, another object of this invention is provide an apparatus for manipulating the controls of each color multiple sensor pixel image sensor from an array of color multiple sensor pixel image sensors to provide a rolling shutter for the array of color multiple sensor pixel image sensors.

To accomplish at least one of these objects, a control apparatus controls operation of an array of a plurality of color multiple sensor pixel image sensors arranged in rows and columns to sense the light impinging upon the image sensors. The control apparatus includes a row control circuit and a column clamp, sample, and hold circuit. The row control circuit is in communication with rows of the array of plurality of color multiple sensor pixel image sensors and generates the necessary reset control signals, transfer gating signals, and row selecting signals for providing the global shuttering and the rolling shuttering of the array of a plurality of color multiple sensor pixel image sensors.

The column clamp, sample and hold circuit is in communication with each column of the array of the plurality of color multiple sensor pixel image sensors to clamp, sample and hold the photo-conversion electrical signals from selected rows of the plurality of color multiple sensor pixel image sensors. From the sampled and held photo-conversion electrical signals, the column clamp, sample and hold circuit generates an output signal representative of a number of photons impinging upon each color multiple sensor pixel image sensor of the row of selected color multiple sensor pixel image sensors.

The control apparatus further includes an analog to digital converter which receives a read out signal that is a combination of the photo-conversion electrical signal representing a reset level on the storage node and the photo-conversion electrical signal representing the photoelectrons on the storage node and converts the read out signal to a digital image signal.

Each of the multiple photosensor pixel image sensors includes a plurality of photo-sensing devices having a structure adjusted to convert photons of the light to photoelectrons representative of a magnitude of a color component of the light for which the structure of the photo-sensing device is adjusted. The multiple photosensor pixel image sensors have at least one storage node connected to selectively receive photoelectrons from each of the plurality of photo-sensing devices. Each of a plurality of transfer gating switches is connected between one of the plurality of photo-sensing devices and the storage node to selectively and sequentially transfer the photoelectrons from each of the plurality of photo-sensing devices to the storage node. At least one reset triggering switch is in communication with the storage node and the transfer gating switches connected to the storage node. The reset triggering switch is activated to place the storage node and the pinned photodiodes through the transfer gating switches to a reset voltage level after integration and sensing of the photoelectrons.

The row control circuit controls the resetting of each of the multiple photosensor pixel image sensors and the time for the integration of photoelectrons generated from the light impinging upon the array of color multiple sensor pixel image sensors. The row control circuit controls the timing of the charge transfer of the photoelectrons by the plurality of transfer gating switches from each of the photo-sensing devices to the storage node. The row control circuit, further, selects the rows of the plurality of color multiple sensor pixel image sensors such that output signals from each of the color multiple sensor pixel image sensors on a selected row are transferred for detection.

The control apparatus performs the global shuttering by first establishing a global reset period. During the global reset period, the row control circuit generates the reset control signals to activate the reset triggering switches and transfer gating signals to activate the transfer gating switches for all rows of the array of the plurality of color multiple sensor pixel image sensors to reset the plurality of photo-sensing devices and the storage node. The control apparatus determines a light integration period. During the light integration period, each of the color multiple sensor pixel image sensors of all rows of the array of color multiple sensor pixel image sensors are exposed to light impinging upon the array of color multiple sensor pixel image sensors. Subsequent to the light integration period, the control apparatus sets a charge transfer period. During the charge transfer period, the row control circuit generates the transfer gating signals to activate one of the transfer gating switches for each row of the array of the plurality of color multiple sensor pixel image sensors to transfer photoelectrons from one of the plurality of photo-sensing devices to the storage node. A pixel image sensor read out period is then established by the control apparatus, in which the row control circuit generates a row control signal to select one of the rows of the array of the plurality of color multiple sensor pixel image sensors. The column clamp, sample and hold circuit then clamps a photo-conversion electrical signal representing the photoelectrons on the storage node. Subsequent to the clamping, the row control circuit generates a reset control signal for a selected row to reset the storage node of each color multiple sensor pixel image sensors of the selected row. The column clamp, sample and hold circuit then clamps a photo-conversion electrical signal representing a reset level on the storage node. These procedures are performed by the row control circuit and the column clamp, sample and hold circuit repetitively until all rows are read out.

The control apparatus performs the rolling shuttering first by establishing a row reset period. During the row reset period, the row control circuit generates the reset control signals to activate the reset triggering switches and transfer gating signals to activate the transfer gating switches for a selected row of the array of the plurality of color multiple sensor pixel image sensors to reset the plurality of photo-sensing devices and the storage node of the selected row. During a light integration period, each of the color multiple sensor pixel image sensors of the selected row of the array of color multiple sensor pixel image sensors is exposed to light impinging upon the array of color multiple sensor pixel image sensors. The control apparatus then sets a row read out period. During the row read out period, the row control circuit generates one row selecting signal for the selected row. During a photo-sensing device read out time, the row control circuit generates a reset control signal to activate all reset triggering switches of the selected row to reset each storage node of the selected row. Subsequent to resetting each storage node of the selected row, the column clamp, sample and hold circuit clamps a photo-conversion electrical signal representing a reset level on the storage node. Upon completion of the clamping, the conversion signal representing the reset level, the row control circuit generates a transfer gating signal to activate one transfer gate of each color multiple sensor pixel image sensor of the selected row such that the column clamp, sample and hold circuit samples and holds clamps a photo-conversion electrical signal representing the photoelectrons on the storage node from one photo-sensing device. The row control circuit and the column clamp, sample and hold circuit repetitively perform these functions for each photo-sensing device within the color multiple sensor pixel image sensors of the selected row. The row control circuit and the column clamp, sample and hold circuit repeatedly perform their function until all rows are read out.

DETAILED DESCRIPTION OF THE INVENTION

The multiple sensor pixel image sensor control apparatus of this invention provides the appropriate control signals for global shuttering and rolling shuttering of an array of the multiple sensor pixel image sensors. The structure of the multiple sensor pixel image sensor for which the multiple sensor pixel image sensor control apparatus of this invention provides the control signals is described in detail in Dosluoglu-840 and is summarized in FIG. 1.

Figure 1:
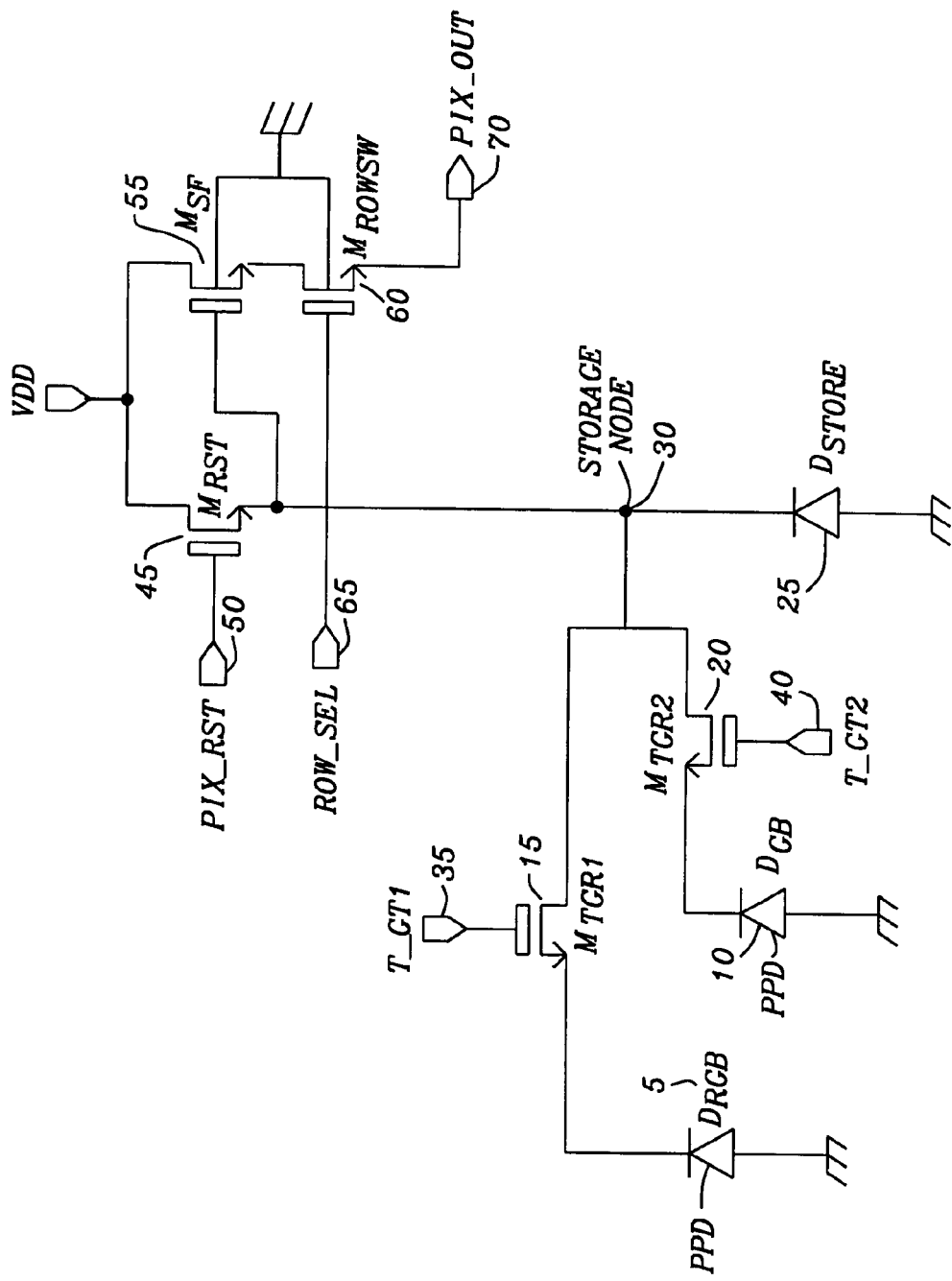
FIG. 1 is a schematic diagram of a color multiple sensor pixel image sensor for which the apparatus of this invention is for manipulating the controls of color multiple sensor pixel image sensor.

Refer to FIG. 1 for an explanation of one half of the multiple photosensor pixel image sensor of Dosluoglu-840 for a review of the component structure. The two photo-sensing devices shown in FIG. 1 are described in FIGS. 3a-3c of Dosluoglu-840. The Red-Green-Blue sensing pinned photodiode $D_{RGB}$ 5 are formed of a P-type pinning diffusion and the junction of a $N^+$ photodiode depletion region and the substrate. The first transfer gate switch transistor 15 has its source formed of the $N^+$ photodiode depletion region. The drain of the first transfer gate switch transistor 15 is the storage node floating diffusion 30. The gate of the first transfer gate switch transistor 15 is connected to the first transfer gating signal T_GT1 35. The pinned photodiode $D_{GB}$ 10 of the Blue-Green photo-sensing device is formed from the junction of a deep P-well conduction well and an $N^+$ photodiode depletion region with a shallow $P^+$ pinning layer. The $N^+$ photodiode depletion region forms the source of the second transfer gate switch transistor 20. As with the transfer gate switch transistor 15, the storage node floating diffusion 30 is the drain of the second transfer gate switch transistor 20. The gate of the second transfer gate switch transistor 20 is the connected to the first transfer gating signal T_GT2 40.

The source of the reset gate switch transistor 45 is the storage node floating diffusion 30 and its drain is an $N^+$ source/drain region. The gate of the reset gate switch transistor 45 is connected to the reset signal 50. The gate of the source follower transistor 55 is connected to the storage node floating diffusion 30. The drain of the source follower transistor 55 is connected to the power supply voltage source VDD and the source of the source follower transistor 55 is connected to the drain of the row switching transistor 60. The gate of the row switching transistor 60 is connected to the row select signal 65. When the row select signal 65 is activated, the row switching transistor 60 transfers the photo-conversion signal representing the number of photoelectrons generated by the photons impinging upon the pinned photodiodes 5 and 10. The source of the row switching transistor 60 is connected to the pixel output terminal 70 that is connected to the row bus of an array of the multiple photosensor pixel image sensors to transfer the photo-conversion signal for further processing.

Figure 2:
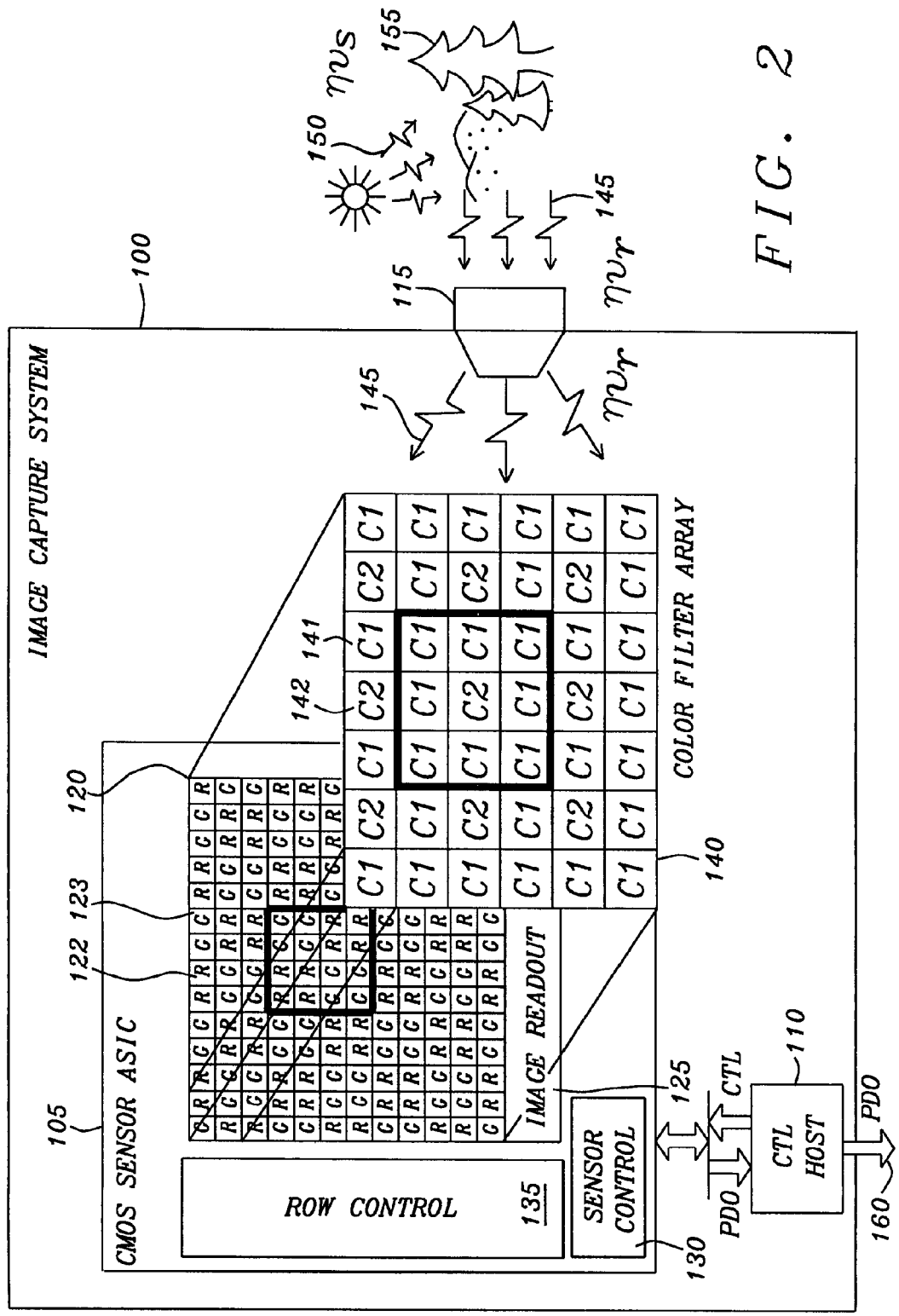
FIG. 2 is a functional diagram of an image capture system of this invention including the apparatus for manipulating the controls of the color multiple sensor pixel image sensor.

An image capture system using the multiple photosensor pixel image sensor of this invention is illustrated in FIG. 2. The image capture system 100 includes the image processing application specific integrated circuit 105, control host 110, and a focusing lens 115. The image processing application specific integrated circuit 105 contains a multiple photosensor pixel image sensor array 120, a row control circuit 135, and an image readout circuit 125. The image processing application specific integrated circuit 105 also contains sensor I/O control 130 with an interface with the control host 110. The sensor I/O control 130 acts as the control and timing circuitry for the row control circuit 135, and the image readout circuit 125. The sensor I/O control 130, the row control circuit 135, and the image readout circuit 125 together form the multiple sensor pixel image sensor control apparatus of this invention.

The snapshot pinned photodiode CMOS active pixel image sensors of the array 120 are as described above. A color filter array 140 is placed above the array of multiple photosensor pixel image sensors 120. The organization of the filter regions 141 and 142 of the color filter array 140 are arranged to be aligned with the photo-sensing devices 122 and 123 of each multiple photosensor pixel image sensor of the array of multiple photosensor pixel image sensor 120 such that the image capture system 100 produces image data 160 that is organized to be equivalent to a video display such as the Pentile Matrix data structure described in U.S. Pat. No. 6,903,754 (Brown-Elliott).

The ambient lighting 150 reflects from the scene 155 and the reflected light 145 is filtered by the color filter regions 141 and 142 of the color filter array 140 and captured by the array of multiple photosensor pixel image sensors 120. The array of the multiple photosensor pixel image sensors 120 converts the photons of the reflected lighting 145 to photoelectrons. The image readout circuit 125 generates digital data signals that transfer to the control host 110 for further processing and from the control host 110 as the pixel data output 160 for eventual display.

Figure 3:
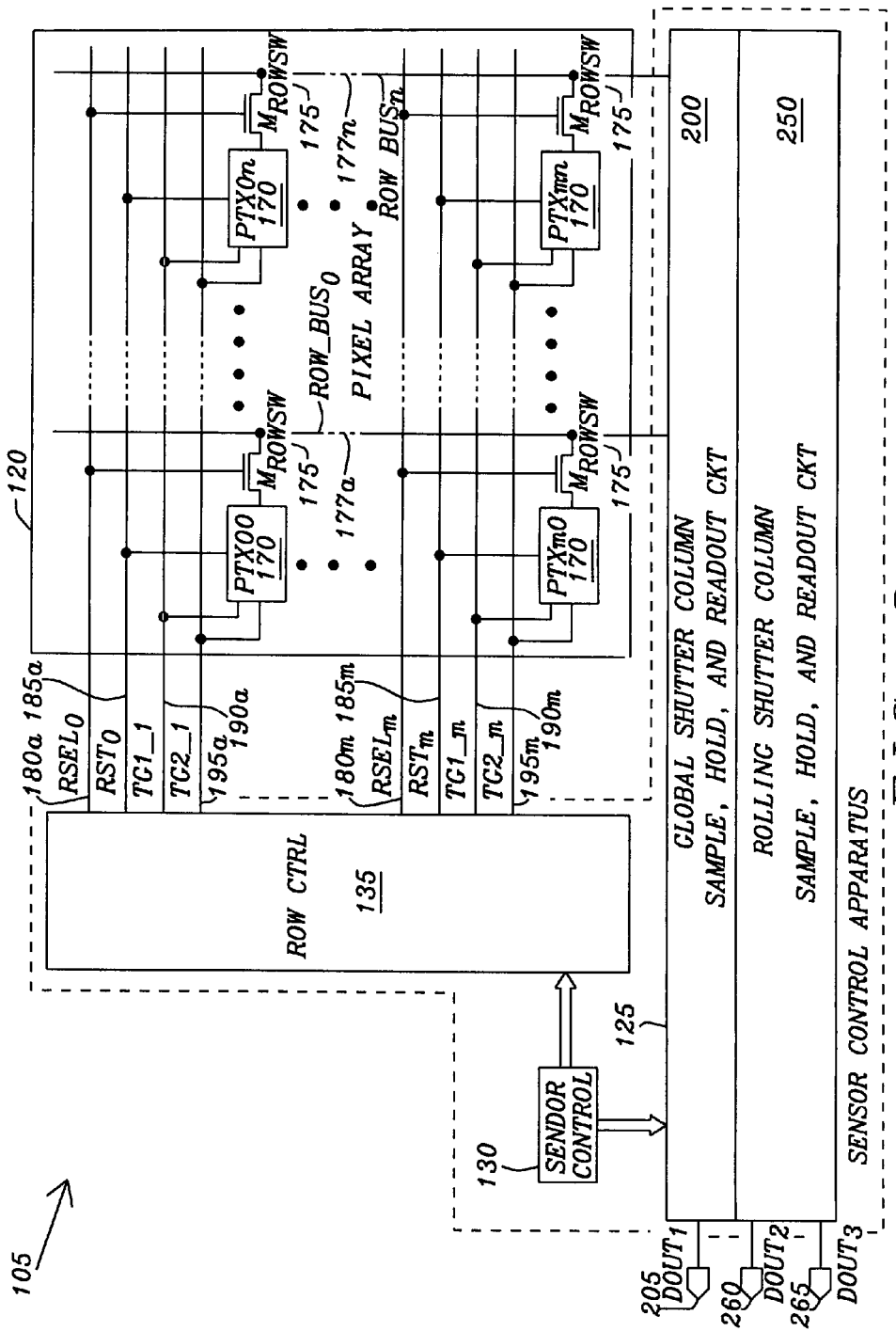
FIG. 3 is a block diagram of an image capture system of this invention including the apparatus for manipulating the controls of the color multiple sensor pixel image sensor.

Refer now to FIG. 3 for a discussion of the structure of the CMOS sensor ASIC 105 illustrating the array 120 of multiple photosensor pixel image sensors 170, the row control circuit 135, and the image circuit 125 that form the sensor control apparatus 30 of this invention. The multiple photosensor pixel image sensors 170 are placed in columns and rows to form the array 120. Each of the multiple photosensor pixel image sensors 170 are structured as explained above. The gate of the row select NMOS gating transistor 175 of each multiple photosensor pixel image sensor on each row of the array 120 is connected to the row select control signal 180a, ..., 180n generated by the row control circuit 135. The source of each row select NMOS gating transistor 175 of each multiple photosensor pixel image sensor 170 on each column of the array 120 is connected to a column sample and hold circuit 125.

The gate of the NMOS reset transistor of each multiple photosensor pixel image sensor 170 on each row of the array 120 is connected to the row reset signal 185a, . . . , 185n generated by the row control circuit 135 for selectively resetting the photo sensing and charge storage device of each of the multiple photosensor pixel image sensors 170. The gate of each NMOS transfer gate of each multiple photosensor pixel image sensor 170 on each row of the array 120 is connected to the first row transfer gate signal 190a, . . . , 190n generated by the row control circuit 135 for transferring the photoelectrons from the first photodiode to the charge storage device of each multiple photosensor pixel image sensor 170. The gate of the second NMOS transfer gate is connected to the second row transfer gate signal 195a, . . . , 195n generated by the row control circuit 135 for transferring the photoelectrons from the second photodiode to the charge storage device.

The column sample and hold circuit 125 have a global shutter column sample, hold, and readout circuit 125a and a rolling shutter column sample, hold, and readout circuit 125b. For the global shuttering of the array 120 of multiple photosensor pixel image sensors 170, each of the pinned photodiodes and the storage node floating diffusions of each of the multiple photosensor pixel image sensors 170 of the array 120 are reset. The pinned photodiodes are exposed to light to receive photons that are converted to photoelectrons. One of the first or second transfer gate switch transistors are activated to transfer the photoelectrons to the storage node floating diffusion and thus to the gate of the source follower transistor for each row of the array 120. The source follower generates the photo-conversion signal representing the number of photoelectrons generated by the photons impinging upon the selected pinned photodiode. The photo-conversion signal is captured by the global shutter column sample, hold, and readout circuit 125a and converted to a digital image output signal 205. The digital image output signal 205 has a resolution that is one half the number of pixels of the array of the array 120 of multiple photosensor pixel image sensors 170.

Due to limitations of available memory in an image capture system incorporating the multiple photosensor pixel image sensor of this invention, the global shutter column sample, hold, and readout circuit 125a reads out only the photons impinging upon one of the selected pinned photodiodes of the selected row of the multiple photosensor pixel image sensors 170. With more available memory the second of the pinned photodiodes could be sequentially read out to the global shutter column sample, hold, and readout circuit 125a.

For the rolling shuttering of the array 120 of multiple photosensor pixel image sensors 170, each of the pinned photodiodes and the storage node floating diffusions of each row of the multiple photosensor pixel image sensors 170 of the array 120 is reset. Each row of the pinned photodiodes is exposed to light to receive photons that are converted to photoelectrons. The first transfer gate switch transistors are activated to transfer the photoelectrons to the storage node floating diffusion and thus to the gate of the source follower transistor for each row of the array 120. The source follower generates the photo-conversion signal representing the number of photoelectrons generated by the photons impinging upon the selected pinned photodiode. The photo-conversion signal is captured by the rolling shutter column sample, hold, and readout circuit 125b and converted to a digital image signal 260. The second transfer gate switch transistors of each selected row is then activated to transfer the photoelectrons to the storage node floating diffusion and thus to the gate of the source follower transistor for each row of the array 120. The source follower generates the photo-conversion signal representing the number of photoelectrons generated by the photons impinging upon the selected pinned photodiode. The photo-conversion signal is captured by the rolling shutter column sample, hold, and readout circuit 125b and converted to a digital image output signal 265.

In the global shuttering, once the first row has been read out, the rolling shuttering operation may begin immediately for the first row. Thus, as each globally shutter row is read out, it can then be operated as a rolling shutter immediately.

Figure 4A:
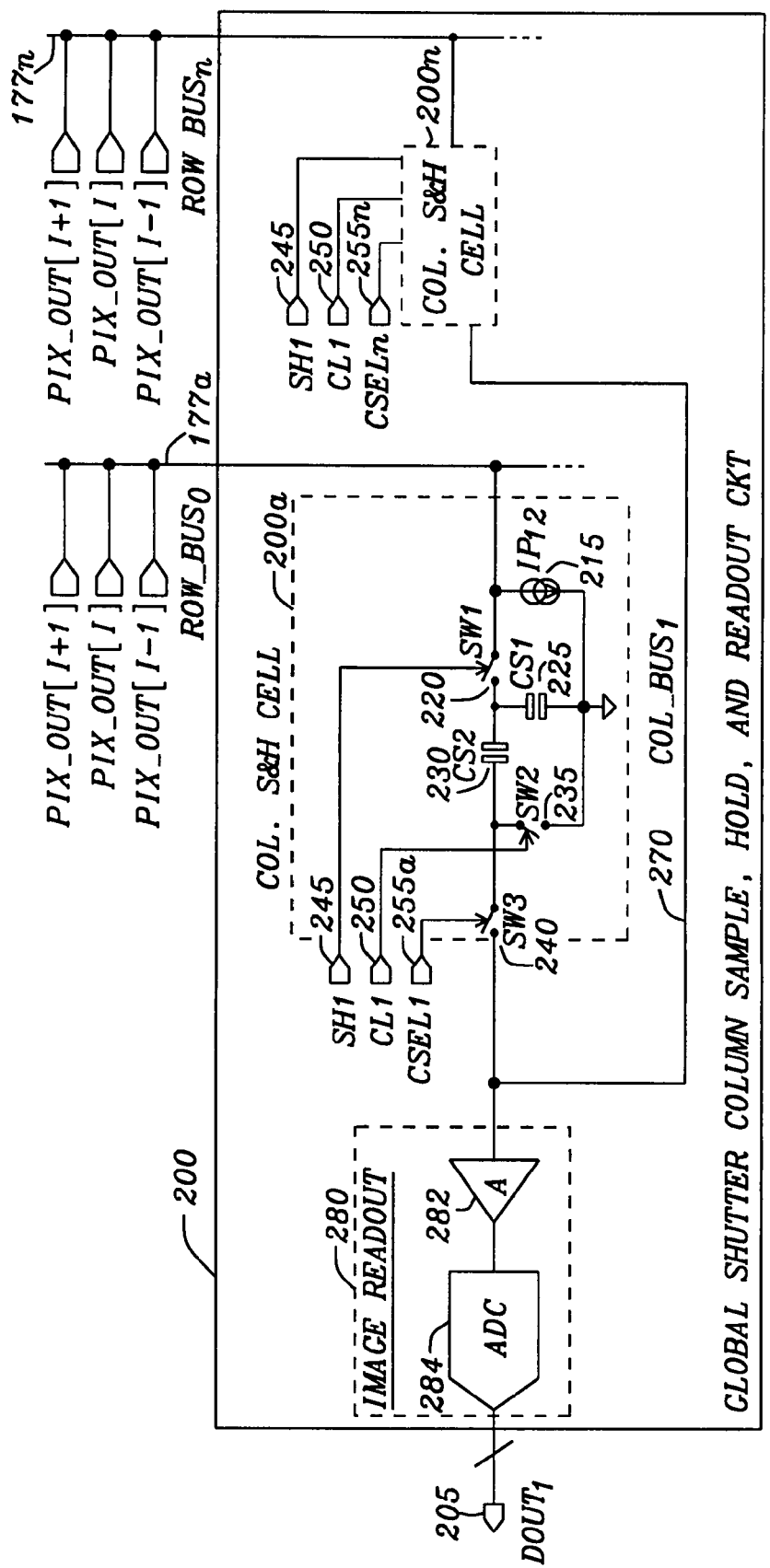
FIG. 4a is a schematic of the global shuttering column clamp, sample, and hold circuit of the apparatus for manipulating the controls of the color multiple sensor pixel image sensor of this invention.

Refer now to FIG. 4a for a discussion of the global shuttering column sample, hold, and readout circuit 200 of the multiple sensor pixel image sensor control apparatus of this invention. The global shuttering column sample, hold, and readout circuit 200 of the multiple sensor pixel image sensor control apparatus of this invention is connected to each row bus 177a, . . . , 177n of the array 120 of multiple photosensor pixel image sensors to receive the photo-conversion signal from the output of each of the multiple photosensor pixel image sensors of a selected row (i) of the array.

Each row bus 177a, . . . , 177n is connected to the global shuttering column sample and hold circuits 200a, . . . , 200n. The global shuttering column sample and hold circuit 200a is exemplary of all the column sample and hold circuits 200a, . . . , 200n and is explained as follows. The current $I_{PIX}$ 215 is the current of the photo-conversion signal from the source follower of the selected row connected to the row bus 177a. The clamp signal CL1 245 activates the switch $SW_2$ 235 to place the capacitors of CS1 230 and CS2 235 in parallel for charging during the conversion period of the photoelectrons to the photo-conversion electrical signal. The switch $SW_2$ 235 is deactivated during the pixel reset time to provide the differential output signal. This combination causes the output voltage Vout to be equal to the differential voltage of pixel reset level and photo conversion electrical signal level, i.e., $V_{out}=V_{rst}-V_{sig}$ of all the pixels in one row is stored in the column sample/hold circuit 200a on series capacitors of CS1 225 and CS2 230 of each column. During the pixel read out, column select switch $SW_3$ 240 controlled by column select signal CSEL1 255a selects the column output.

The output of the column sample and hold circuit 200a is applied to the input of the image readout circuit 280. The image readout circuit 280 had the video amplifier 282 that amplifies the sampled and held photo-conversion signal. The amplified sampled and held photo-conversion conversion signal is transferred to the analog-to-digital converter 284 which generates the digital imaging signal 205. The output of each of the column sample and hold circuits 200a, . . . , 200n is connected to the column bus 270 that is connected to the input of the image readout circuit 280. The column select switch $SW_3$ 240 of each of the global shuttering column sample and hold circuits 200a, . . . , 200n is connected to the column bus 270 and each of the column select switches $SW_3$ 240 are sequentially activated to serially read out the digital data of each multiple photosensor pixel image sensors 170 on a selected row.

Figure 4B:
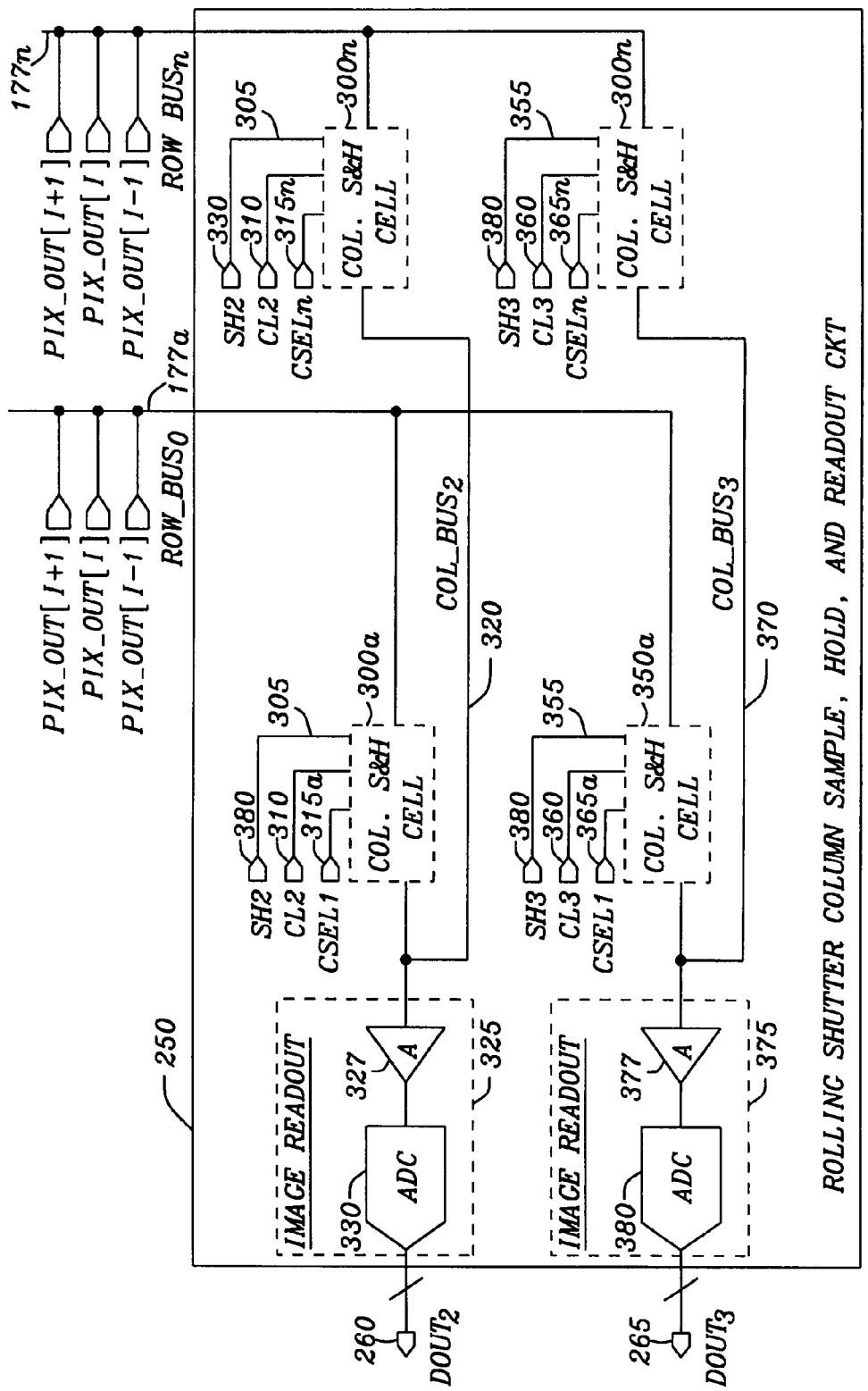
FIG. 4b is a schematic of the rolling shuttering column clamp, sample, and hold circuit of the apparatus for manipulating the controls of the color multiple sensor pixel image sensor of this invention.

Refer now to FIG. 4b for a discussion of the rolling shuttering column sample, hold, and readout circuit 250 of the multiple sensor pixel image sensor control apparatus of this invention. The rolling shuttering column sample, hold, and readout circuit 250 of the multiple sensor pixel image sensor control apparatus of this invention is connected to each row bus 177a, . . . , 177n of the array 120 of multiple photosensor pixel image sensors to receive the photo-conversion signal from the output of each of the multiple photosensor pixel image sensors of a selected row (i) of the array. Each row bus 177a, . . . , 177n is connected to a rolling shuttering column sample and hold circuits 300a, . . . , 300n, 350a, . . . , 350n. The rolling shuttering column sample and hold circuits 300a, . . .

, 300*n*, 350*a*, ..., 350*n* are structured and function as the global shutter column sample and hold circuit 200*a* as explained in FIG. 4*a*.

The output of each of the rolling shuttering column sample and hold circuits 300*a*, ..., 300*n* is applied to the input of the image readout circuit 325. The image readout circuit 325 had the video amplifier 327 that amplifies the sampled and held photo-conversion signal. The amplified sampled and held photo-conversion signal is transferred to the analog-to-digital converter 330 which generates the digital imaging signal 260. The output of each of the rolling shuttering column sample and hold circuits 300*a*, ..., 300*n* is connected to the column bus 320 that is connected to the input of the image readout circuit 325. The column select switch of each of the rolling shuttering column sample and hold circuits 300*a*, ..., 300*n* is connected to the column bus 320 and each of the column select switches are sequentially activated to serially read out the digital data of each multiple photosensor pixel image sensors 170 on a selected row.

The output of each of the rolling shuttering column sample and hold circuits 350*a*, ..., 350*n* is applied to the input of the image readout circuit 375. The image readout circuit 375 has the video amplifier 377 that amplifies the sampled and held photo-conversion signal. The amplified sampled and held photo-conversion signal is transferred to the analog-to-digital converter 380 which generates the digital imaging signal 265. The output of each of the rolling shuttering column sample and hold circuits 350*a*, ..., 350*n* is connected to the column bus 370 that is connected to the input of the image readout circuit 375. The column select switch of each of the rolling shuttering column sample and hold circuits 350*a*, ..., 350*n* is connected to the column bus 370 and each of the column select switches are sequentially activated to serially read out the digital data of each multiple photosensor pixel image sensors 170 on a selected row.

Figure 5:
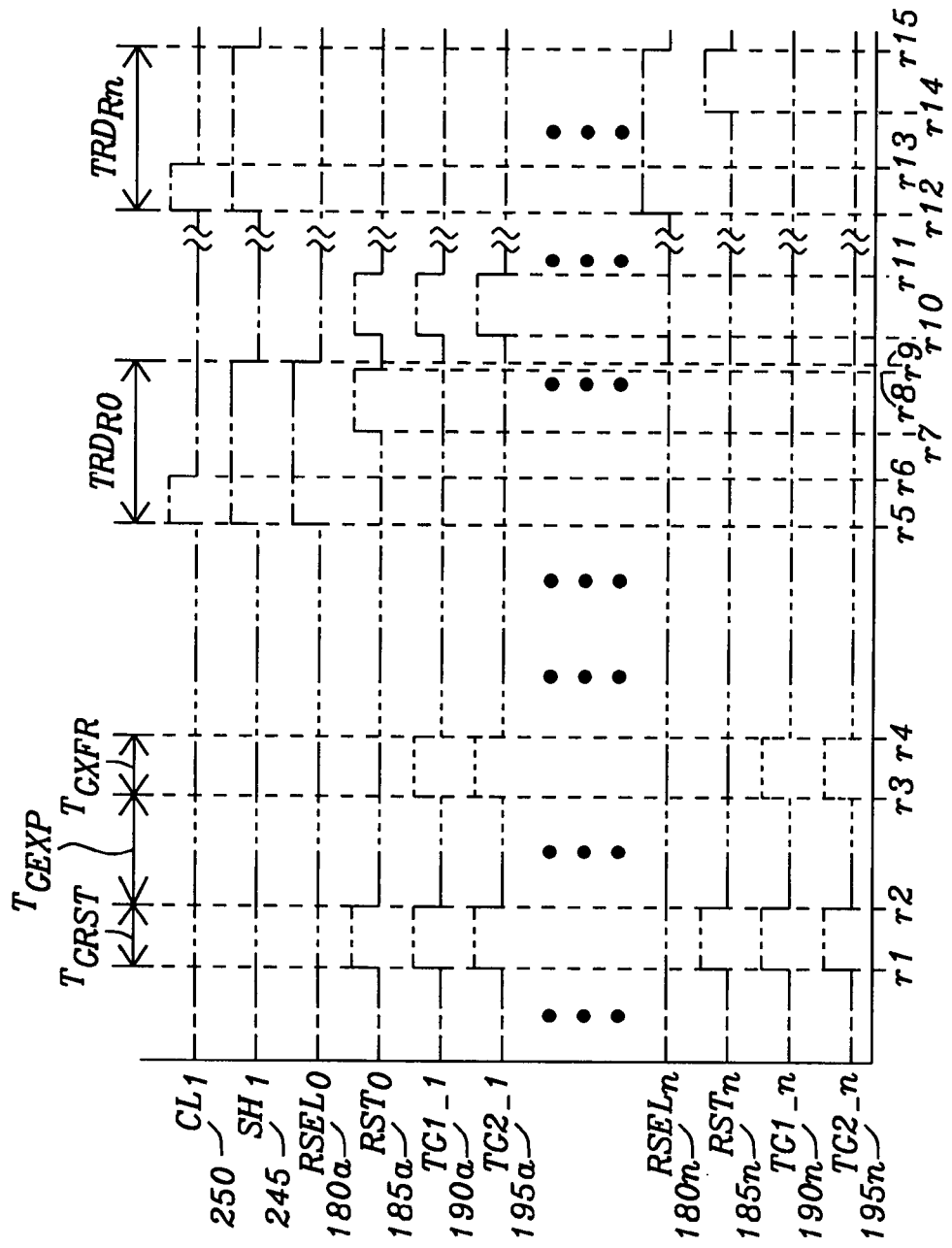
FIG. 5 is a plot of the timing for the operation of the apparatus for manipulating the controls of the color multiple sensor pixel image sensor of this invention for a global shuttering.

Refer now to FIGS. 3, 4*a*, and 5 for the plots of the signals generated by the row control circuitry 135 and the global shuttering column sample and hold circuits 200 under the control and timing command of the sensor I/O control 130. During the global reset time period $T_{GRST}$ between the time $\tau_1$ and the time $\tau_2$, the sensor I/O control 130 commands the row control circuit 135 to activate all the row reset signals 185*a*, ..., 185*n* to turn on the reset transistor of each of the reset transistors of all the multiple photosensor pixel image sensors 170 of the array 120. Simultaneously, the sensor I/O control 130 commands the row control circuit 135 to activate all the first transfer gate signals 190*a*, ..., 190*n* and the second transfer gate signals 195*a*, ..., 195*n* to activated the first and second transfer gate switch transistors of the multiple photosensor pixel image sensors 170 to reset all the two pinned photodiodes and the storage node floating diffusions of the multiple photosensor pixel image sensors 170 to the voltage level of the power supply voltage source. The pinned photodiodes of each of the multiple photosensor pixel image sensors 170 of the array 120 are now exposed to the light for an integration period $T_{GEXP}$ between the time $\tau_2$ and the time $\tau_3$. The photons of the light are now converted to photoelectrons within the pinned photodiodes. During the photoelectron transfer time $T_{GXFR}$ between the time $\tau_3$ and the time $\tau_4$, the sensor I/O control 130 commands the row control circuit 135 to activate all the first row transfer gate signals 190*a*, ..., 190*n* or the second row transfer gate signals 195*a*, ..., 195*n* to activated the first or second transfer gate switch transistors of the multiple photosensor pixel image sensors 170 to transfer the photoelectrons integrated on one of the two pinned photodiodes to the storage node floating diffusions for all the multiple photosensor pixel image sensors 170 of the array 120.

At the time $\tau_5$, the first row read out period $TRD_{RO}$ begins with the sensor I/O control 130 commanding the row control circuit 135 to activate row select control signal 180*a*, ..., 180*n* to turn on the row select NMOS gating transistor 175 of the first row of the array 120. The sensor I/O control 130 commands the row control circuit 135 to activate the first clamping signal $CL_1$ 250 of the global shuttering column sample and hold circuits 200*a*, ..., 200*n* to capture the photo-conversion signal from the first row of the array 120 of multiple photosensor pixel image sensors 170. At the time $\tau_6$, the sensor I/O control 130 commands the row control circuit 135 to deactivate the first clamping signal $CL_1$ 250 of the global shuttering column sample and hold circuits 200*a*, ..., 200*n* and at the time $\tau_7$, the sensor I/O control 130 commands the row control circuit 135 to activate the row reset signal 185*a* to turn on the reset transistor of each of the reset transistors of the first row of the array 120 of the multiple photosensor pixel image sensors 170. The global shuttering column sample and hold circuits 200*a*, ..., 200*n* to capture the reset signal level from the first row of the array 120 of multiple photosensor pixel image sensors 170. The sensor I/O control 130 commands the row control circuit 135 to deactivate the row reset signals 185*a* to turn off the reset transistor of each of the reset transistors of the first row of the array 120 of the multiple photosensor pixel image sensors 170, at the time $\tau_8$. The first row read out period $TRD_{RO}$ is terminated at the time $\tau_9$ when the sensor I/O control 130 commands the row control circuit 135 to deactivate the row select control signal 180*a* to turn off each of the row select NMOS gating transistor 175 of the first row of the array 120 the multiple photosensor pixel image sensors 170. The sensor I/O control 130 commands the global shuttering column sample and hold circuits 200*a*, ..., 200*n* to deactivate the sample and hold signal $SH_1$ 245.

The sensor I/O control 130 commands the row control circuit 135 and global shuttering column sample and hold circuits 200*a*, ..., 200*n* to sequentially activate and deactivate the control signals as described for the first row of the array 120 the multiple photosensor pixel image sensors 170 to read out the photo-conversion signal representing the number of photoelectrons gathered by each of the pinned photodiodes of one half of the multiple photosensor pixel image sensors 170 of the array 120.

The last row read out period $TRD_{Rn}$ of the array 120 the multiple photosensor pixel image sensors 170 begins at the time time $\tau_{12}$. The sensor I/O control 130 commands the row control circuit 135 to activate row select control signal 180*n* to turn on the row select NMOS gating transistor 175 of the last row of the array 120. The sensor I/O control 130 commands the row control circuit 135 to activate the first clamping signal $CL_1$ 250 of the global shuttering column sample and hold circuits 200*a*, ..., 200*n* to capture the photo-conversion signal from the first row of the array 120 of multiple photosensor pixel image sensors 170. At the time $\tau_{13}$, the sensor I/O control 130 commands the row control circuit 135 to deactivate the first clamping signal $CL_1$ 250 of the global shuttering column sample and hold circuits 200*a*, ..., 200*n* and at the time $\tau_{14}$, the sensor I/O control 130 commands the row control circuit 135 to activate the row reset signal 185*n* to turn on the reset transistor of each of the reset transistors of the first row of the array 120 of the multiple photosensor pixel image sensors 170. The global shuttering column sample and hold circuits 200*a*, ..., 200*n* to capture the reset signal level from the first row of the array 120 of multiple photosensor pixel image sensors 170. The sensor I/O control 130 commands the row control circuit 135 to deactivate the row reset signals 185a to turn off the reset transistor of each of the reset transistors of the first row of the array 120 of the multiple photosensor pixel image sensors 170, at the time $\tau_{15}$. The first row read out period $TRD_{RO}$ is terminated at the time $\tau_{16}$ when the sensor I/O control 130 commands the row control circuit 135 to deactivate the row select control signal 180n to turn off each of the row select NMOS gating transistor 175 of the first row of the array 120 the multiple photosensor pixel image sensors 170. The sensor I/O control 130 commands the global shuttering column sample and hold circuits 200a, . . . , 200n to deactivate the sample and hold signal $SH_1$ 245.

Optionally, at the time $\tau_{10}$, the row control circuit 135 activates the row reset signal 185a to turn on the reset transistors of the first row of the multiple photosensor pixel image sensors 170 of the array 120. Simultaneously, the sensor I/O control 130 commands the row control circuit 135 to activate the first transfer gate signal 190a and the second transfer gate signal 195a to activate the first and second transfer gate switch transistors of the multiple photosensor pixel image sensors 170 to reset all the two pinned photodiodes and the storage node floating diffusions of the multiple photosensor pixel image sensors 170 to the voltage level of the power supply voltage source. This is the beginning of a rolling shutter operation that is optionally started during the completion of the global shutter operation.

Figure 6:
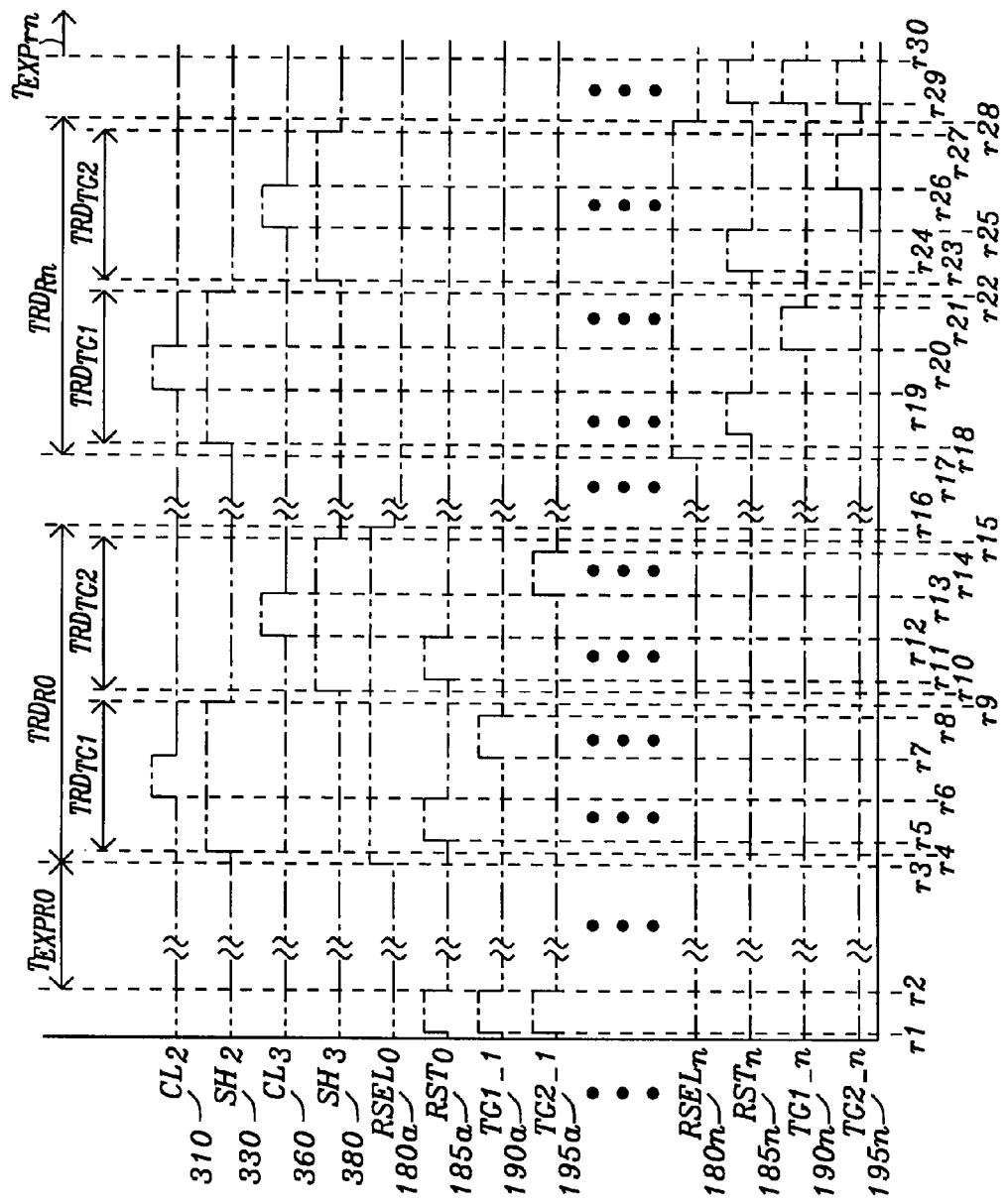
FIG. 6 is a plot of the timing for the operation of the apparatus for manipulating the controls of the color multiple sensor pixel image sensor of this invention for a rolling shuttering.

Refer now to FIGS. 3, 4b and 6 for the plots of the signals generated by the row control circuitry 135 and the rolling shuttering column sample and hold circuits 250 under the control and timing command of the sensor I/O control 130. Between the time $\tau_1$ and the time $\tau_2$, the sensor I/O control 130 commands the row control circuit 135 to activate the row reset signals 185a to turn on the reset transistor of each of the reset transistors of the first row of the array 120 of the multiple photosensor pixel image sensors 170. Simultaneously, the sensor I/O control 130 commands the row control circuit 135 to activate the first transfer gate signals 190a and the second transfer gate signals 195a to activated the first and second transfer gate switch transistors of the first row of the of the array 120 of the multiple photosensor pixel image sensors 170 to reset all the two pinned photodiodes and the storage node floating diffusions of the first row of the array 120 of the multiple photosensor pixel image sensors 170 to the voltage level of the power supply voltage source. The pinned photodiodes of each of the multiple photosensor pixel image sensors 170 of the array 120 are now exposed to the light for an integration period $T_{EXPR0}$ between the time $\tau_2$ and the time $\tau_3$. The photons of the light are now converted to photoelectrons within the pinned photodiodes.

At the time $\tau_3$, the first row read out period $TRD_{RO}$ begins with the sensor I/O control 130 commanding the row control circuit 135 to activate row select control signal 180a to turn on the row select NMOS gating transistor 175 of the first row of the array 120. At the time $\tau_4$, the sensor I/O control 130 commands the rolling shuttering column sample and hold circuits 250 to activate the second sample and hold signal $SH_2$ 330 for capturing the correlated double sampling of the reset signal level and the photo-conversion signal of the first pinned photodiode. Between the time $\tau_5$ and the time $\tau_6$, the sensor I/O control 130 commands the row control circuit 135 to activate the row reset signal 185a to turn on the reset transistor of each of the reset transistors of the first row of the array 120 the multiple photosensor pixel image sensors 170 to set the storage node floating diffusions for the first row of the array 120 the multiple photosensor pixel image sensors 170 to the reset signal level of the power supply voltage source VDD. Between the time $\tau_6$ and time $\tau_7$, the sensor I/O control 130 commands the rolling shuttering column sample and hold circuit 250 to activate the second clamping signal $CL_2$ 310 to capture the reset signal level of the storage node floating diffusion. Between the time $\tau_7$ and time $\tau_8$, the sensor I/O control 130 commands the row control circuit 135 to activate the first row transfer gate signal 190a to activated the first transfer gate switch transistors of the first row of the array 120 of the multiple photosensor pixel image sensors 170 to transfer the photoelectrons integrated the first pinned photodiodes to the storage node floating diffusions for first row of the array 120 of the multiple photosensor pixel image sensors 170. Between the time $\tau_7$ and time $\tau_9$, the rolling shuttering column sample and hold circuits 300a, . . . , 300n sample and hold the photo-conversion signal of the first row of the array 120 of the multiple photosensor pixel image sensors 170. At the time $\tau_9$ the sensor I/O control 130 commands the rolling shuttering column sample and hold circuit 250 to deactivate the second sample and hold signal $SH_2$ 330.

At the time $\tau_{10}$, the sensor I/O control 130 commands the rolling shuttering column sample and hold circuits 250 to activate the third sample and hold signal $SH_3$ 380 for capturing the correlated double sampling of the reset signal level and the photo-conversion signal of the second pinned photodiode. Between the time $\tau_{11}$ and the time $\tau_{12}$, the sensor I/O control 130 commands the row control circuit 135 to activate the row reset signal 185a to turn on the reset transistor of each of the reset transistors of the first row of the array 120 the multiple photosensor pixel image sensors 170 to set the storage node floating diffusions for the first row of the array 120 the multiple photosensor pixel image sensors 170 to the reset signal level of the power supply voltage source VDD. Between the time $\tau_{12}$ and time $\tau_{13}$, the sensor I/O control 130 commands the rolling shuttering column sample and hold circuit 250 to activate the second clamping signal $CL_2$ 310 to capture the reset signal level of the storage node floating diffusion. Between the time $\tau_{13}$ and time $\tau_{14}$, the sensor I/O control 130 commands the row control circuit 135 to activate the first row transfer gate signal 195a to activated the second transfer gate switch transistors of the first row of the array 120 of the multiple photosensor pixel image sensors 170 to transfer the photoelectrons integrated the second pinned photodiodes to the storage node floating diffusions for first row of the array 120 of the multiple photosensor pixel image sensors 170. Between the time $\tau_{13}$ and time $\tau_{15}$, the rolling shuttering column sample and hold circuits 350a, . . . , 350n sample and hold the photo-conversion signal of the first row of the array 120 of the multiple photosensor pixel image sensors 170. At the time $\tau_{15}$, the sensor I/O control 130 commands the rolling shuttering column sample and hold circuit 250 to deactivate the third sample and hold signal $SH_3$ 380.

The first row read out period $TRD_{RO}$ is completed at the time $\tau_{16}$ when the sensor I/O control 130 commands the row control circuit 135 to deactivate row select control signal 180a to turn off the row select NMOS gating transistor 175 of the first row of the array 120. Each row is sequentially read out after the row reset signal 185x, first row transfer gate signal 190x, second row transfer gate signal 195x generated by the row control circuit 135 for the row x to reset the two pinned photodiodes and the storage node floating diffusion to the reset signal level and expose to integrate the photons and convert them to photoelectrons.

The initial image of a rolling shutter operation is essentially global shutter exposure and readout as described in FIG. 5. At the completion of the first row read out period $TRD_{RO}$ at the time $\tau_{16}$, the first row is reset as is shown between the time $\tau_1$ and the time $\tau_2$. The sensor I/O control 130 commands the row control circuit 135 to activate all the row reset signals 185a to turn on the reset transistor of the reset transistors of all the multiple photosensor pixel image sensors 170 of the first row of the array 120. Simultaneously, the sensor I/O control 130 commands the row control circuit 135 to activate all the first transfer gate signals 190a and the second transfer gate signals 195a to activated the first and second transfer gate switch transistors of the multiple photosensor pixel image sensors 170 of the first row to reset all the two pinned photodiodes and the storage node floating diffusions of the multiple photosensor pixel image sensors 170 to the voltage level of the power supply voltage source. Similarly, each row (Rx) is reset subsequent to its read out period $TRD_{Rx}$. The multiple photosensor pixel image sensors 170 of the row is then exposed while the remaining rows are being read out in a rolling fashion.

At the time $\tau_{17}$, the last row read out period $TRD_{Rn}$ begins with the sensor I/O control 130 commanding the row control circuit 135 to activate row select control signal 180n to turn on the row select NMOS gating transistor 175 of the last row of the array 120. At the time $\tau_{18}$, the sensor I/O control 130 commands the rolling shuttering column sample and hold circuits 250 to activate the second sample and hold signal $SH_3$ 380 for capturing the correlated double sampling of the reset signal level and the photo-conversion signal of the first pinned photodiode. Between the time $\tau_{18}$ and the time $\tau_{19}$, the sensor I/O control 130 commands the row control circuit 135 to activate the row reset signal 185n to turn on the reset transistor of each of the reset transistors of the last row of the array 120 the multiple photosensor pixel image sensors 170 to set the storage node floating diffusions for the last row of the array 120 the multiple photosensor pixel image sensors 170 to the reset signal level of the power supply voltage source VDD. Between the time $\tau_{19}$ and time $\tau_{20}$, the sensor I/O control 130 commands the rolling shuttering column sample and hold circuit 250 to activate the third clamping signal $CL_3$ 360 to capture the reset signal level of the storage node floating diffusion. Between the time $\tau_{20}$ and time 121, the sensor I/O control 130 commands the row control circuit 135 to activate the first row transfer gate signal 190n to activated the first transfer gate switch transistors of the last row of the array 120 of the multiple photosensor pixel image sensors 170 to transfer the photoelectrons integrated the first pinned photodiodes to the storage node floating diffusions for last row of the array 120 of the multiple photosensor pixel image sensors 170. Between the time $\tau_{20}$ and time $\tau_{22}$, the rolling shuttering column sample and hold circuits 300a, ..., 300n sample and hold the photo-conversion signal of the last row of the array 120 of the multiple photosensor pixel image sensors 170. At the time $\tau_{22}$, the sensor I/O control 130 commands the rolling shuttering column sample and hold circuit 250 to deactivate the second sample and hold signal $SH_2$ 330.

At the time $\tau_{23}$, the sensor I/O control 130 commands the rolling shuttering column sample and hold circuits 250 to activate the third sample and hold signal $SH_3$ 380 for capturing the correlated double sampling of the reset signal level and the photo-conversion signal of the second pinned photodiode. Between the time $\tau_{24}$ and the time $\tau_{25}$, the sensor I/O control 130 commands the row control circuit 135 to activate the row reset signal 185a to turn on the reset transistor of each of the reset transistors of the last row of the array 120 the multiple photosensor pixel image sensors 170 to set the storage node floating diffusions for the last row of the array 120 the multiple photosensor pixel image sensors 170 to the reset signal level of the power supply voltage source VDD. Between the time $\tau_{25}$ and time $\tau_{26}$, the sensor I/O control 130 commands the rolling shuttering column sample and hold circuit 250 to activate the second clamping signal $CL_2$ 310 to capture the reset signal level of the storage node floating diffusion. Between the time $\tau_{26}$ and time $\tau_{27}$, the sensor I/O control 130 commands the row control circuit 135 to activate the second row transfer gate signal 195a to activated the second transfer gate switch transistors of the last row of the array 120 of the multiple photosensor pixel image sensors 170 to transfer the photoelectrons integrated the second pinned photodiodes to the storage node floating diffusions for last row of the array 120 of the multiple photosensor pixel image sensors 170. Between the time $\tau_{26}$ and time $\tau_{28}$, the rolling shuttering column sample and hold circuits 350a, ..., 350n sample and hold the photo-conversion signal of the last row of the array 120 of the multiple photosensor pixel image sensors 170. At the time $\tau_{27}$, the sensor I/O control 130 commands the rolling shuttering column sample and hold circuit 250 to deactivate the third sample and hold signal $SH_3$ 380.

The last row read out period $TRD_{Rn}$ is completed at the time $\tau_{28}$ when the sensor I/O control 130 commands the row control circuit 135 to deactivate row select control signal 180a to turn off the row select NMOS gating transistor 175 of the first row of the array 120. Between the time. $\tau_{29}$ and the time $\tau_{30}$, the sensor I/O control 130 commands the row control circuit 135 to activate the row reset signals 185n to turn on the reset transistor of each of the reset transistors of the first row of the array 120 of the multiple photosensor pixel image sensors 170. Simultaneously, the sensor I/O control 130 commands the row control circuit 135 to activate the first transfer gate signals 190n and the second transfer gate signals 195n to activated the first and second transfer gate switch transistors of the last row of the of the array 120 of the multiple photosensor pixel image sensors 170 to reset all the two pinned photodiodes and the storage node floating diffusions of the last row of the array 120 of the multiple photosensor pixel image sensors 170 to the voltage level of the power supply voltage source. This allows the exposure of the last row of the next image that is to be captured. The read out of the first row can begin immediately following the completion of the read out period $TRD_{Rn}$ of the last row of the array 120.

Figure 7:
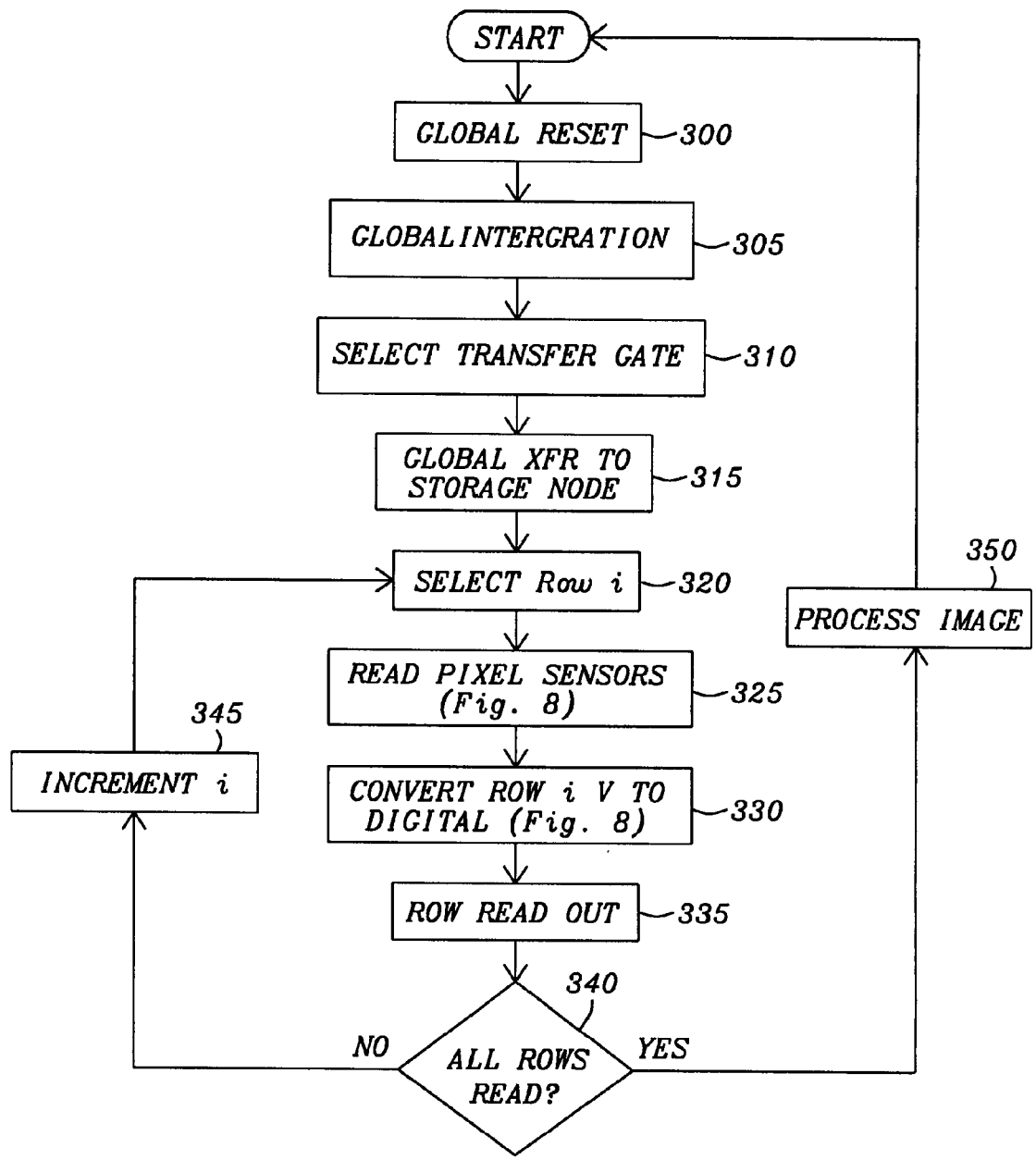
FIGS. 7-8 are flowcharts for the method of this invention for performing a global shuttering of a color multiple sensor pixel image sensor.

Refer now to FIG. 7 for a summary of the method of global shuttering an array of color multiple sensor pixel image sensors arranged in rows and columns. All the reset transistors and the first and second transfer gate switch transistors of each of the color multiple sensor pixel image sensors of the array are activated to globally reset (Box 300) the array of color multiple sensor pixel image sensors. The array of color multiple sensor pixel image sensors are exposed collect and integrated (Box 305) the photons of light that impinge upon the array. At the end of the integration time, one of the first or second transfer gate switch transistors are activated to select (Box 310) one of the pinned photodiodes of each of the color multiple sensor pixel image sensors of the array for transfer (Box 315) of the photoelectrons to the storage node floating diffusion for read out.

Figure 8:
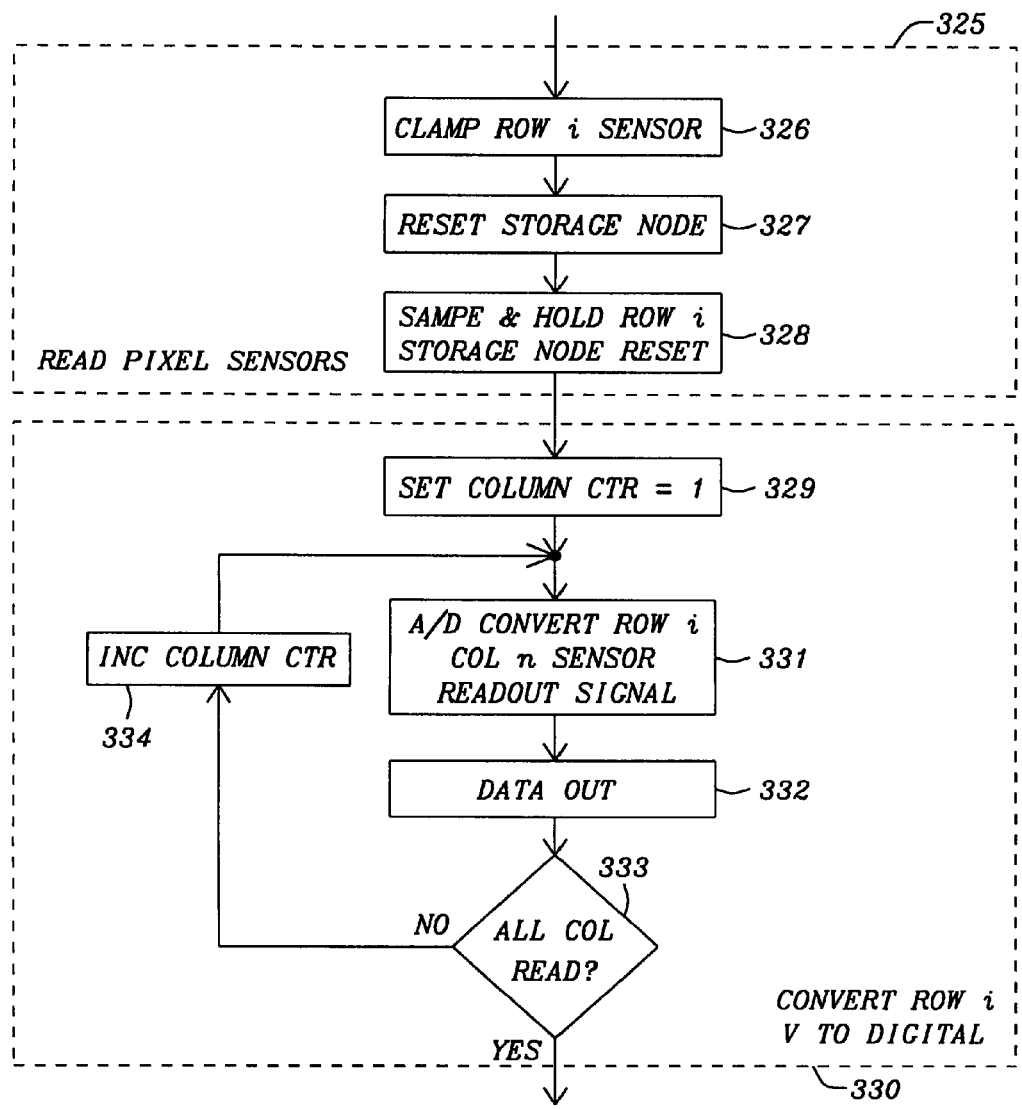

A row counter is initialized to select (Box 320) the first row to be read out. Refer now to FIG. 8 for the read out (Box 325) of array of color multiple sensor pixel image sensors. The selected row (i) is clamped (Box 326) to capture to photo-conversion signal representing the number of photon impinging upon the selected pinned photodiode. The storage node for each of the color multiple sensor pixel image sensors is reset (Box 327) to the reset signal level of the power supply voltage source VDD. The reset signal level is then sampled and held (Box 328). Briefly, referring back to FIG. 7, the combination of the clamped photo-conversion signal and the sampled and held reset signal are then converted (Box 330) to the digital imaging signal which is further explained in FIG. 8. As noted above for the description of the physical array, the color multiple sensor pixel image sensors of each column of the array are sampled and held simultaneously and then serially read out. A column counter is incremented during the process for counting each read out of the clamped photo-conversion signal and sampled and held reset signal. The column counter is initialized (Box 329) and the combined clamped photo-conversion signal and sampled and held reset signal is amplified and converted (Box 331) to a digital image signal and sent (Box 332) to an output for transfer to other circuitry for further processing. A test (Box 333) is performed to check if all columns are read out. If not the column counter is incremented (Box 334), and the combined clamped photo-conversion signal and sampled and held reset signal for the next column is amplified and converted (Box 331) to a digital image signal and sent (Box 332) to an output for transfer to other circuitry for further processing. This continues until all columns are read.

Referring back to FIG. 7, the digital image signal of the row is read out (Box 335) and stored. A check (Box 340) is performed if all rows of the row have been performed. If not, the row counter (i) is incremented (Box 345) and the next row is read out as described above. When all rows are read out any necessary image processing (Box 350) is performed and the next global shuttered image is started.

Figure 9:
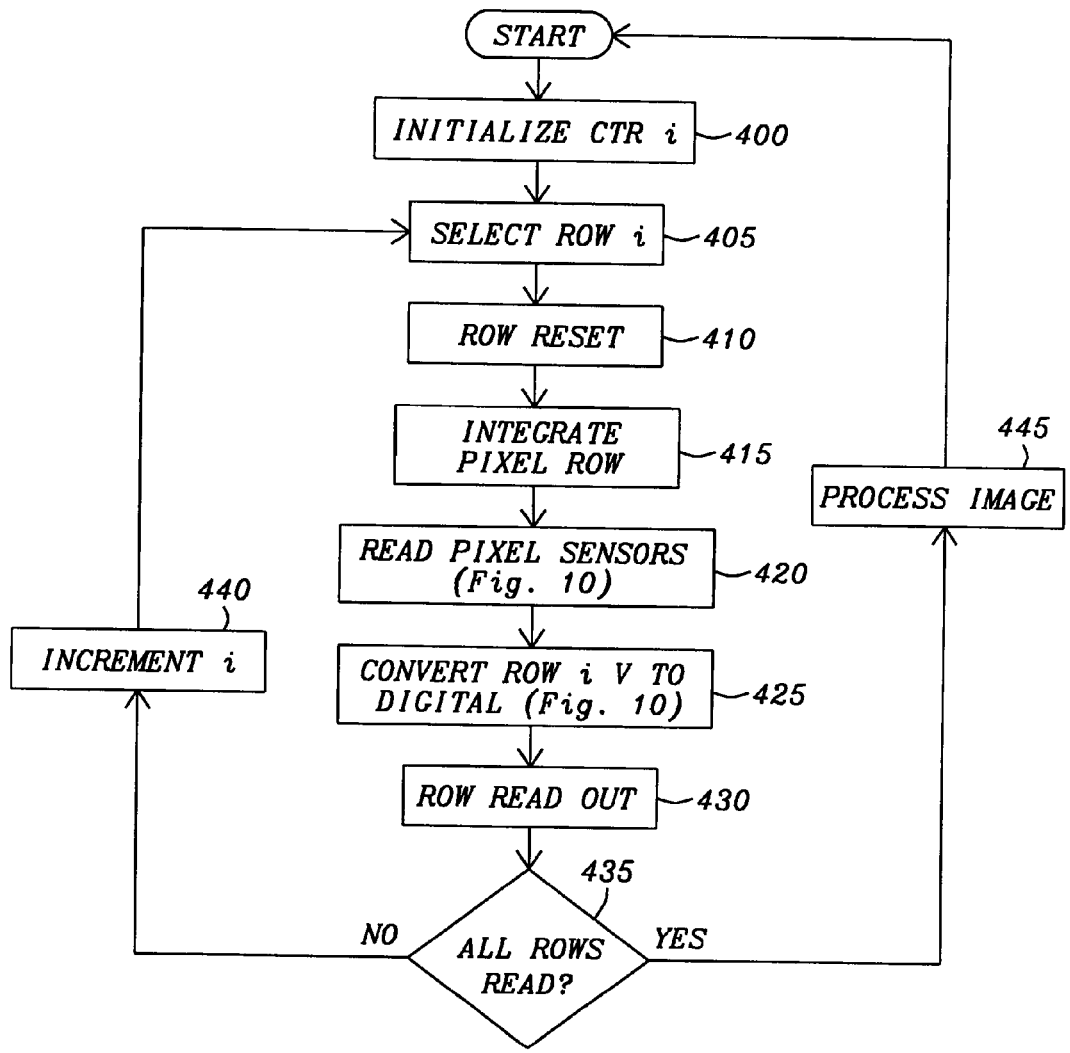
FIGS. 9-10 are flowcharts for the method of this invention for performing a rolling shuttering of a color multiple sensor pixel image sensor.
Figure 10:
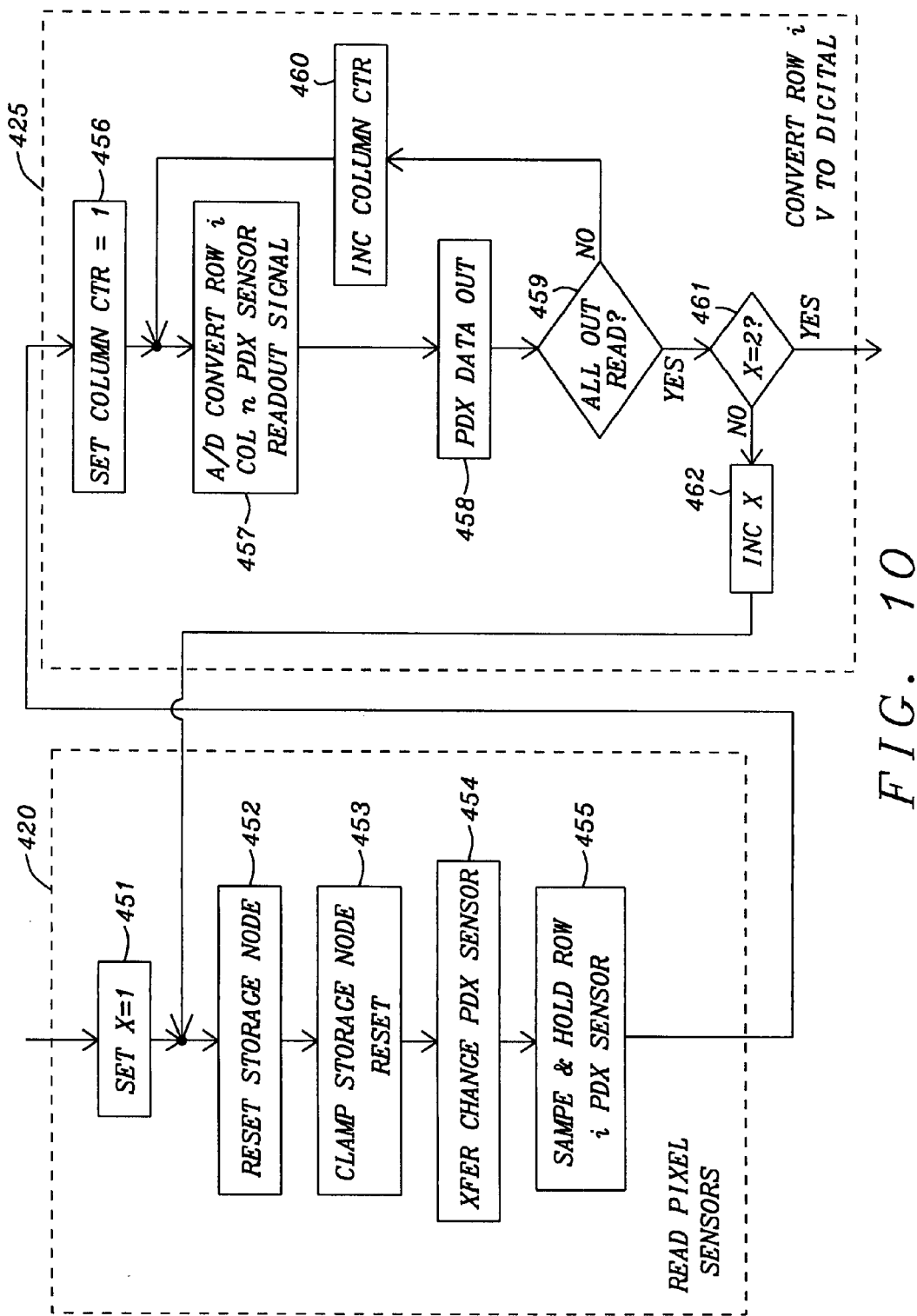
Figure 3:
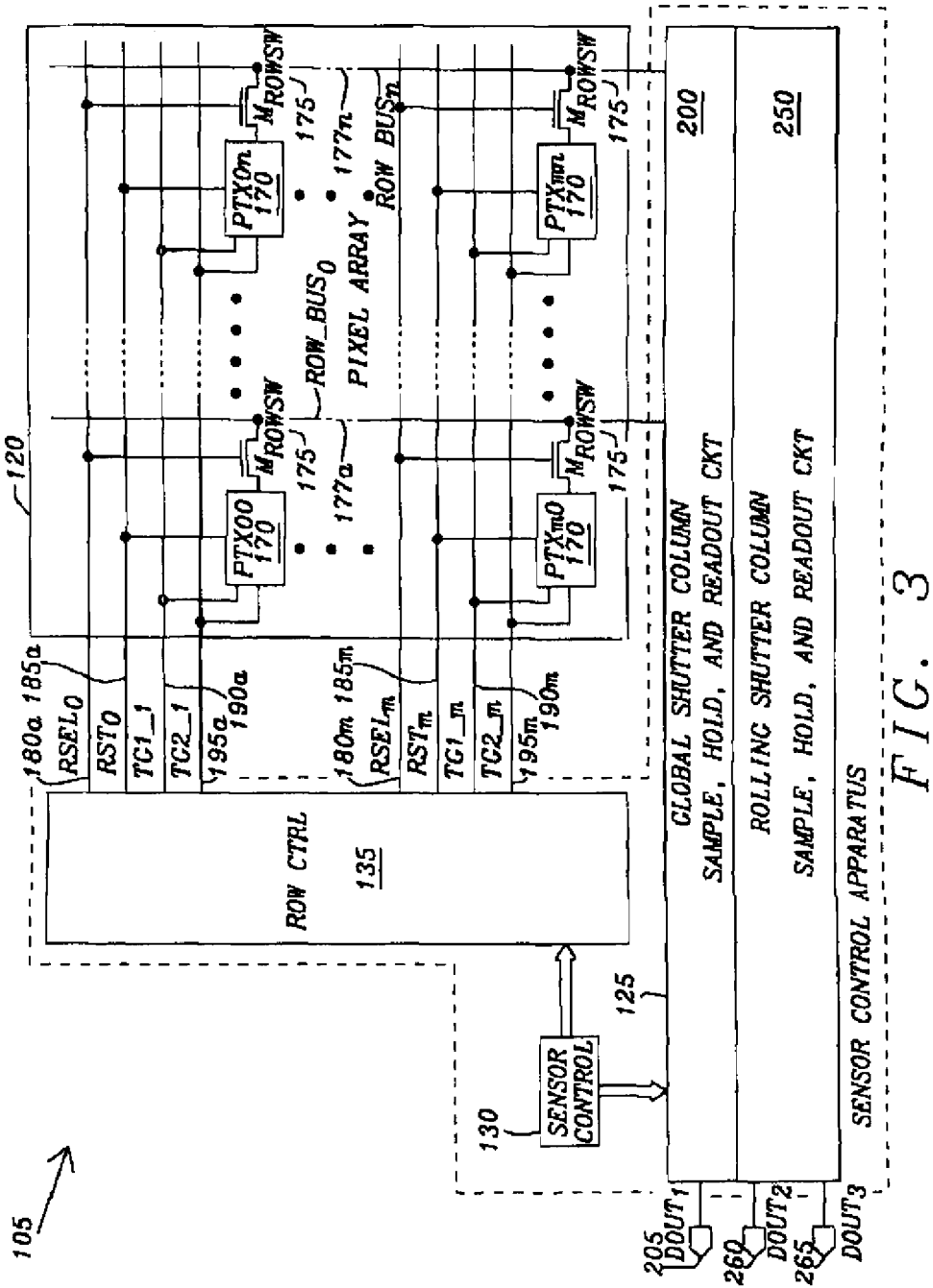
Figure 4A:
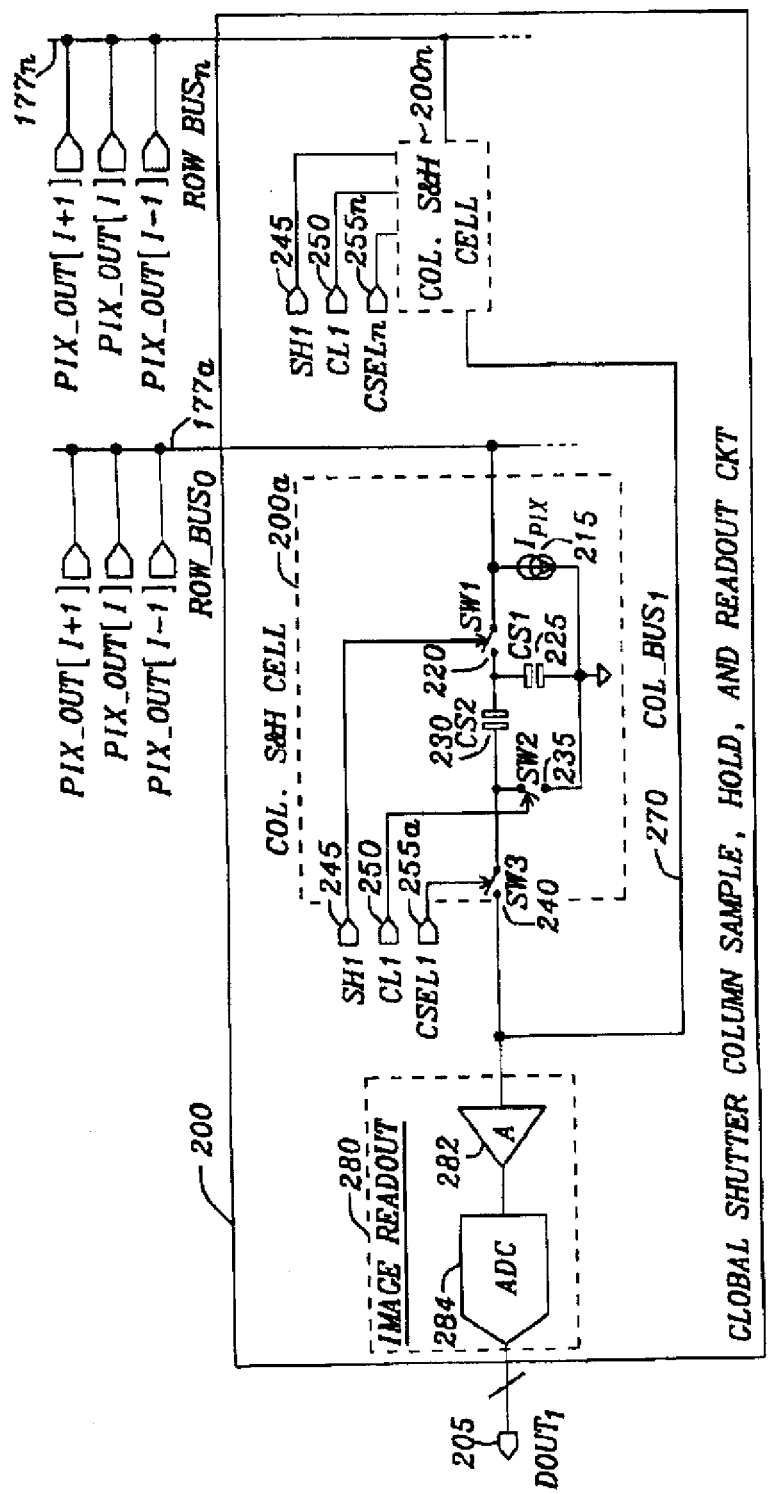
Figure 7:
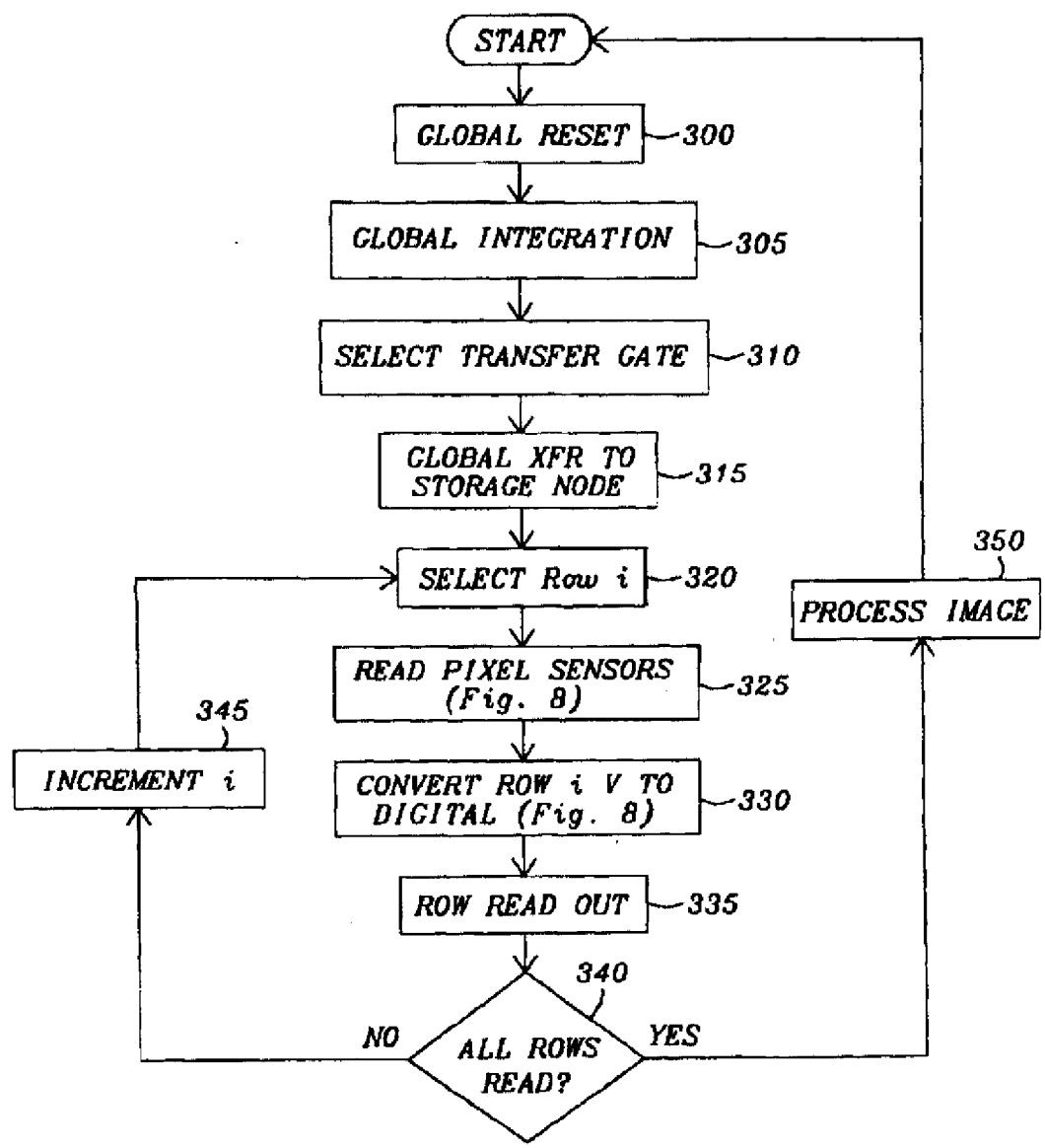
Figure 8:
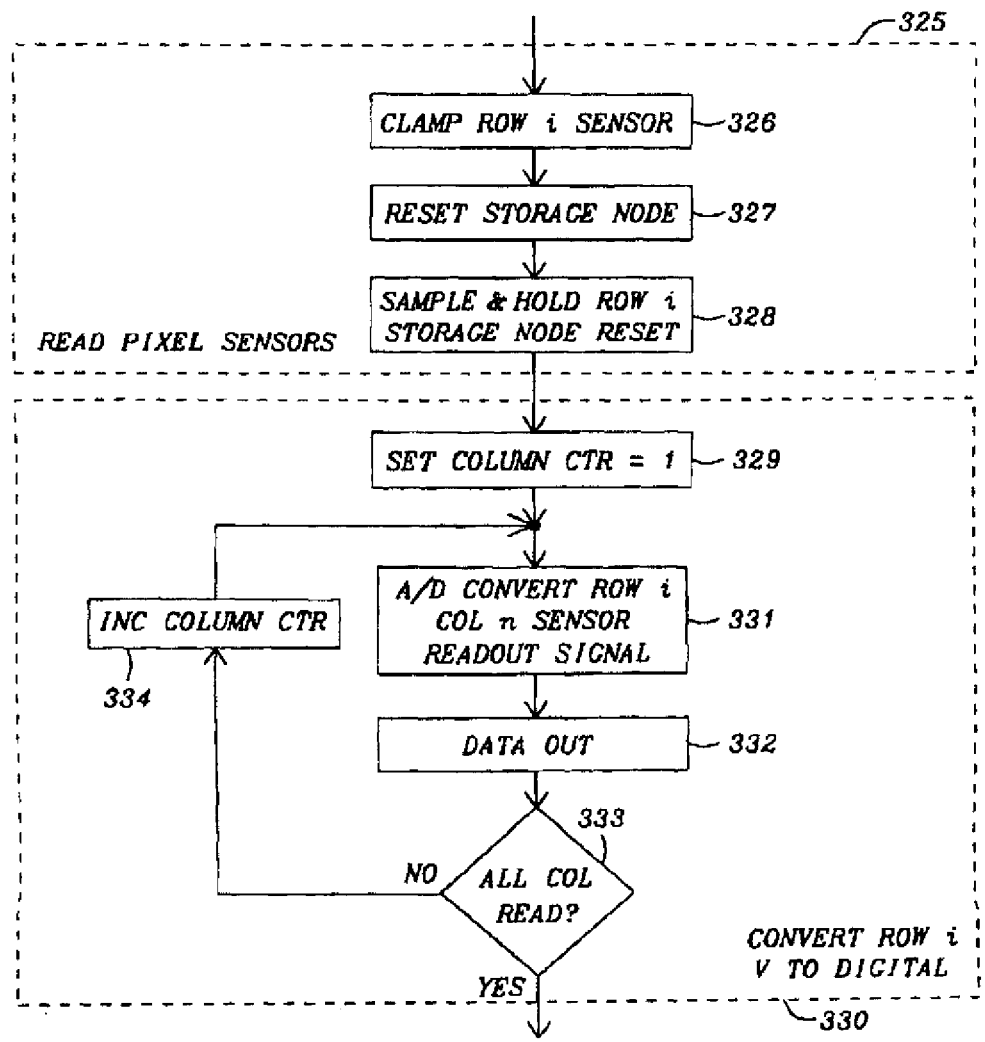
Figure 10:
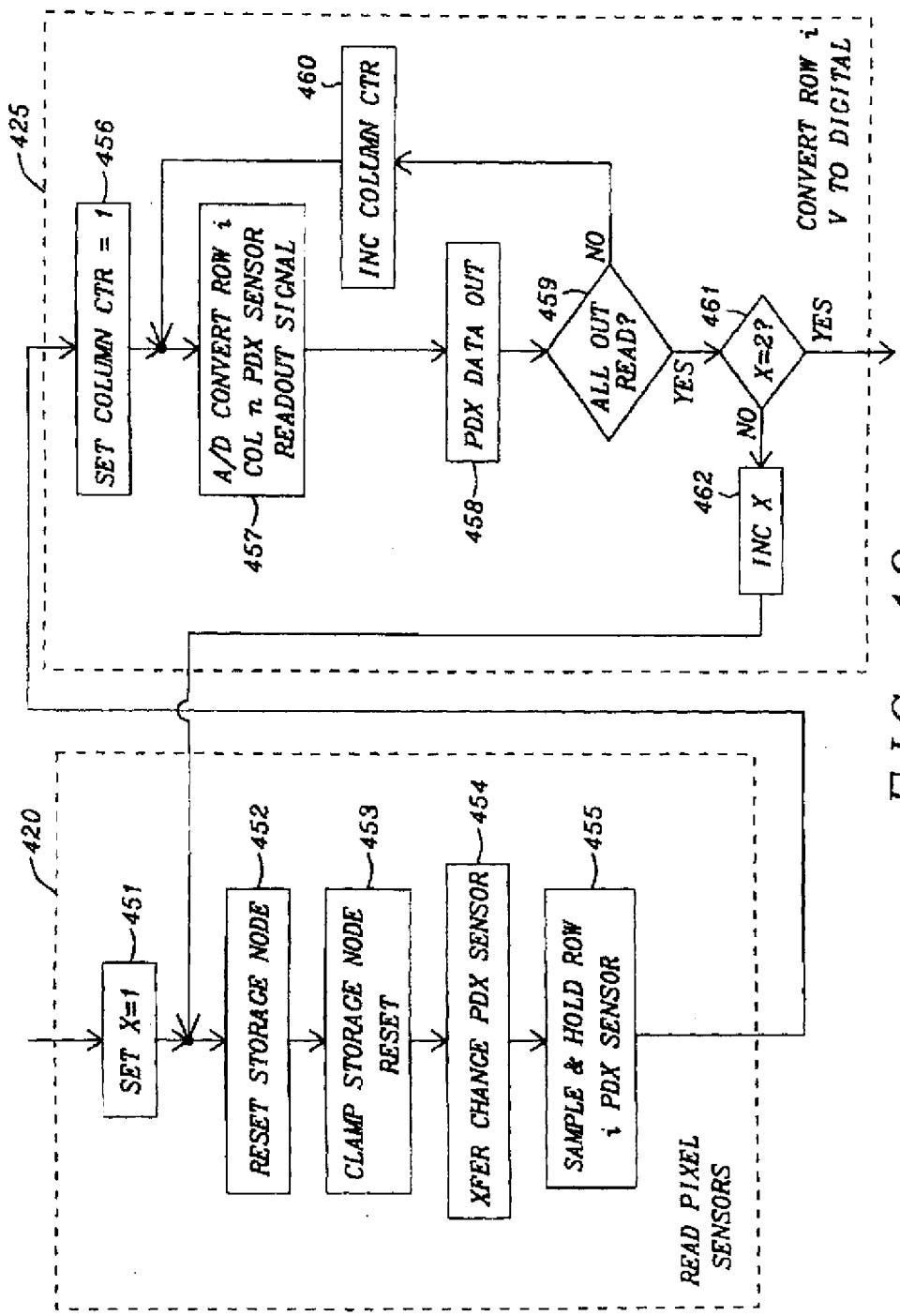

Alternately, at the completion at least the read out of the first row of a global shutter or during a separate rolling shuttering operation, the rolling shuttering operation can begin. Also, in summary of the method of rolling shuttering an array of color multiple sensor pixel image sensors arranged in rows and columns. Refer now to FIG. 9, a row counter is initialized to select (Box 400) the first row to be read out. All the reset transistors and the first and second transfer gate switch transistors of each of the color multiple sensor pixel image sensors of the selected row (i) of the array are activated to reset (Box 410) the row (i) of the array of color multiple sensor pixel image sensors. The selected row (i) of the array of color multiple sensor pixel image sensors is exposed collect and integrated (Box 415) the photons of light that impinge upon the array. At the end of the integration time, the selected row (i) of the array is read out (Box 415) as shown in FIG. 10. The transfer gate counter is initialized (Box 451) to select the first transfer gate switch transistor. The transfer gate counter determines which of the first or second transfer gate switch transistors are activated to transfer the photoelectrons from one of the two pinned photodiodes to the storage node floating diffusion. The reset gate switch transistor is activated to reset (Box 452) the storage node floating diffusion to the reset signal level of the power supply voltage source VDD. The selected row (i) is clamped (Box 453) to capture to reset signal level. The transfer gates signal is activated to activate the selected first or second transfer gate switch transistors in the first case the first transfer gate switch to transfer the photo-conversion signal representing the number of photon impinging upon the selected pinned photodiode to the storage node floating diffusion. The storage node floating diffusion for each of the color multiple sensor pixel image sensors is read out and then sampled and held (Box 455). Briefly, referring back to FIG. 9, the combination of the sampled and held photo-conversion signal and the clamped reset signal are then converted (Box 425) to the digital imaging signal which is further explained in FIG. 10. As noted above for the description of the physical array, the color multiple sensor pixel image sensors of each column of the array are sampled and held simultaneously and then serially read out. A column counter is incremented during the process for counting each read out of the clamped photo-conversion signal and sampled and held reset signal. The column counter is initialized (Box 456) and the combined sampled and held photo-conversion signal and the clamped reset signal is amplified and converted (Box 457) to a digital image signal and sent (Box 458) to an output for transfer to other circuitry for further processing. A test (Box 459) is performed to check if all columns are read out. If not the column counter is incremented (Box 460), and the combined sampled and held photo-conversion signal and the clamped reset signal for the next column is amplified and converted (Box 457) to a digital image signal and sent (Box 458) to an output for transfer to other circuitry for further processing. This continues until all columns are read.

Once all the columns are read (Box 459), a test (Box 461) is made to determine if both of the pinned photodiodes have been read out. If not, the transfer gate counter is incremented (Box 462) and the steps as described above for the first pinned photodiode are repeated for the second pinned photodiode.

Referring back to FIG. 9, when both pinned photodiodes are read out, the digital image signal of the row is read out (Box 430) and stored. A check (Box 435) is performed if all rows of the row has been performed. If not, the row counter (i) is incremented (Box 440) and the next row is read out as described above. When all rows are read out any necessary image processing (Box 445) is performed and the next globally shuttered image is started.

While this invention has been particularly shown and described with reference to the preferred embodiments thereof, it will be understood by those skilled in the art that various changes in form and details may be made without departing from the spirit and scope of the invention.

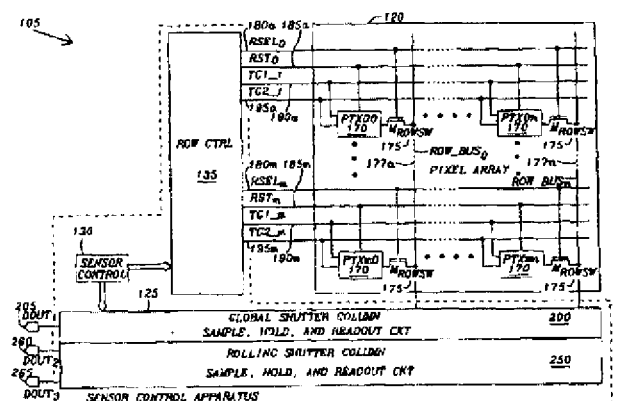

The invention claimed is:

1. A device comprising:
a plurality of rows of image sensors configured to sense light corresponding to an image, each image sensor including a first light sensing device and a second light sensing device; and
a control device configured to:
read a first voltage from the first light sensing device as part of a global shuttering operation associated with the plurality of rows of image sensors;
read a second voltage from the second light sensing device as part of a rolling shuttering operation associated with the plurality of rows of image sensors, wherein voltages of each image sensor are read one row at a time from the plurality of rows of image sensors;
generate an image output signal based, at least in part, on the voltages read from the plurality of rows of image sensors for both the global shuttering operation and the rolling shuttering operation; and
initiate a next global shuttering operation after the voltages for all of the plurality of rows of image sensors have been read.

2. The device of claim 1, wherein the control device is further configured to:
select an image sensor;
read a voltage level corresponding to the light from the selected image sensor;
reset the selected image sensor;
read a reset voltage level corresponding to the selected image sensor after the reset of the selected image sensor; and
generate an image output signal based, at least in part, on the light sensed by the selected image sensor and the reset voltage level corresponding to the selected image sensor.

3. The device of claim 1, wherein the control device is further configured to sequentially read both the first voltage and the second voltage from each image sensor in the rolling shuttering operation.

4. The device of claim 1, wherein the control device further comprises:
a row control circuit configured to select a row of the image sensors to transfer voltage levels corresponding to light sensed by the image sensors in the selected row and to transfer reset voltage levels of the image sensors in the selected row; and
a column control circuit configured to combine the voltage levels and the reset voltage levels corresponding to each image sensor in the selected row to generate image voltage levels, and generate an image output signal from the image voltage levels.

5. The device of claim 1, wherein the first light sensing device is configured to generate the first voltage with a magnitude corresponding to a magnitude of light sensed by the first light sensing device, and wherein each image sensor further comprises:
a storage node configured to store the first voltage; and
a first transfer switch configured to transfer the first voltage from the first light sensing device to the storage node.

6. The device of claim 5, wherein each image sensor further comprises a reset switch configured to set the storage node to a reset voltage.

7. The device of claim 6, wherein the second light sensing device is configured to generate the second voltage with a magnitude corresponding to a magnitude of light sensed by the second light sensing device and wherein each sensor further comprises a second transfer switch configured to set the storage node to the second voltage from the reset voltage.

8. The device of claim 7, wherein each image sensor further comprises an output switch configured to provide the control device an output corresponding to a voltage level of the storage node.

9. A method comprising:
reading, by a control device, a first voltage corresponding to light sensed by a first light sensing device in an image sensor as part of a global shuttering mode of operation associated with a plurality of rows of image sensors, wherein each image sensor comprises a first light sensing device and a second light sensing device;
selectively reading, by the control device, a second voltage corresponding to light sensed by a second light sensing device in the image sensor as part of a rolling shuttering mode of operation of the control device, wherein voltages of each image sensor are read one row at a time from the plurality of rows of image sensors;
generating, by the control device, an image output signal corresponding to the image sensor from the first voltage and selectively from the second voltage based on the shuttering mode of the control device; and
initiating, by the control device, a next global shuttering mode of operation after the voltages for all of the plurality of rows of image sensors have been read.

10. The method of claim 9, further comprising reading, by the control device, at least one reset voltage of the image sensor.

11. The method of claim 10, wherein generating the image output signal further comprises combining, by the control device, the first voltage and the reset voltage to determine at least a portion of the image output signal.

12. The method of claim 10, wherein generating the image output signal further comprises combining, by the control device, the second voltage and the reset voltage to determine at least another portion of the image output signal.

13. The method of claim 9, wherein generating the image output signal further comprises:
combining, by the control device, the first voltage with a reset voltage of the image sensor to determine at least a first portion of the image output signal; and
combining, by the control device, the second voltage with the reset voltage of the image sensor to determine at least a second portion of the image output signal.

14. The method of claim 13, wherein generating the image output signal further comprises sequentially arranging, by the control device, the first portion and the second portion in the image output signal.

15. The method of claim 9, further comprising:
generating, by the control module, a series of images including a first image based on voltages corresponding to the light sensed by the first light sensing device of each image sensor during the global shuttering mode of operation; and
generating, by the control module, a second image of the series of images based on voltages corresponding to the light sensed by both the first light sensing device and the second light sensing device of each image sensor during the rolling shuttering mode of operation.

16. The method of claim 15, wherein the first image has a resolution that is one half the resolution associated with the second image.

17. An apparatus including a computer-readable memory device storing instructions configured to cause a processing device to perform operations comprising:
reading a first voltage corresponding to light sensed by a first light sensing device in an image sensor as part of a global shuttering mode of operation associated with a plurality of rows of image sensors, wherein each image sensor comprises a first light sensing device and a second light sensing device;
selectively reading a second voltage corresponding to light sensed by a second light sensing device in the image sensor as part of a rolling shuttering mode of operation associated with the plurality of rows of image sensors, wherein voltages of each image sensor are read one row at a time from the plurality of rows of image sensors;
generating an image output signal corresponding to the image sensor from the first voltage and selectively from the second voltage based on the shuttering mode of operation associated with the plurality of rows of image sensors; and
initiating a next global shuttering mode of operation after the voltages for all of the plurality of rows of image sensors have been read.

18. The apparatus of claim 17, wherein the operations further comprise reading at least one reset voltage of the image sensor.

19. The apparatus of claim 18, wherein generating the image output signal further comprises combining the first voltage and the reset voltage to determine at least a portion of the image output signal.

20. The apparatus of claim 18, wherein generating the image output signal further comprises combining the second voltage and the reset voltage to determine at least another portion of the image output signal.

21. The apparatus of claim 17, wherein generating the image output signal further comprises:
combining the first voltage with a reset voltage of the image sensor to determine at least a first portion of the image output signal; and combining the second voltage with the reset voltage of the image sensor to determine at least a second portion of the image output signal.

22. The apparatus of claim 21, wherein generating the image output signal further comprises sequentially arranging the first portion and the second portion in the image output signal.

\* \* \* \* \*

UNITED STATES PATENT AND TRADEMARK OFFICE
CERTIFICATE OF CORRECTION

| | | |
|---|---|---|
| PATENT NO. | : 8,582,011 B2 | Page 1 of 8 |
| APPLICATION NO. | : 13/403862 | |
| DATED | : November 12, 2013 | |
| INVENTOR(S) | : Dosluoglu | |

It is certified that error appears in the above-identified patent and that said Letters Patent is hereby corrected as shown below:

The Title Page showing the illustrative figure should be deleted to be replaced with the attached title page.

On the Title Page, Item (56), under "OTHER PUBLICATIONS", in Column 2, Line 1, delete "Imge" and insert -- Image --, therefor.

On the Title Page, Item (74), under "Attorney, Agent, or Firm", in Column 2, Line 1, delete "Cower LLP" and insert -- Cowger LLP --, therefor.

In the Drawings

Drawing sheets, consisting of Figs. 3, 4a, 7, 8 and 10, should be deleted to be replaced with the drawing sheets, consisting of Figs. 3, 4a, 7, 8 and 10, as shown on the attached pages.

In the Specification

In Column 2, Line 33, delete "Vol:" and insert -- Vol.: --, therefor.

In Column 6, Line 33, delete "sensors 120." and insert -- sensors 170. --, therefor.

In Column 6, Line 37, delete "sensor 120" and insert -- sensor 170 --, therefor.

In Column 6, Line 45, delete "sensors 120." and insert -- sensors 170. --, therefor.

In Column 6, Line 46, delete "sensors 120" and insert -- sensors 170 --, therefor.

In Column 8, Line 26, delete "CL1 245" and insert -- $CL_1$ 250 --, therefor.

Signed and Sealed this
Nineteenth Day of August, 2014

Michelle K. Lee
*Deputy Director of the United States Patent and Trademark Office*

CERTIFICATE OF CORRECTION (continued)
U.S. Pat. No. 8,582,011 B2

In Column 8, Line 32, delete "Vout" and insert -- $V_{out}$ --, therefor.

In Column 10, Line 48, delete "time time" and insert -- time --, therefor.

In Column 13, Line 37, delete "121, the" and insert -- $\tau_{21}$, the --, therefor.

In Column 14, Line 21, delete "time. $\tau_{29}$" and insert -- time $\tau_{29}$ --, therefor.

(12) United States Patent
Dosluoglu

(10) Patent No.: US 8,582,011 B2
(45) Date of Patent: Nov. 12, 2013

(54) SIMULTANEOUS GLOBAL SHUTTER AND CORRELATED DOUBLE SAMPLING READ OUT IN MULTIPLE PHOTOSENSOR PIXELS

(75) Inventor: Taner Dosluoglu, New York, NY (US)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 0 days.

(21) Appl. No.: 13/403,862

(22) Filed: Feb. 23, 2012

(65) Prior Publication Data
US 2012/0154648 A1 Jun. 21, 2012

Related U.S. Application Data

(63) Continuation of application No. 11/998,126, filed on Nov. 28, 2007, now Pat. No. 8,184,190.

(60) Provisional application No. 60/861,389, filed on Nov. 28, 2006.

(51) Int. Cl.
*H04N 3/14* (2006.01)
*H04N 5/335* (2011.01)

(52) U.S. Cl.
USPC .......................... 348/308; 348/296; 348/310

(58) Field of Classification Search
USPC ........................... 348/296, 308, 310
See application file for complete search history.

(56) References Cited

U.S. PATENT DOCUMENTS

| | | | |
|---|---|---|---|
| 3,971,065 A | 7/1976 | Bayer | |
| 4,011,016 A | 3/1977 | Layne et al. | |
| 4,309,604 A | 1/1982 | Yoshikawa et al. | |
| 4,613,895 A | 9/1986 | Burkey et al. | |
| 5,028,970 A | 7/1991 | Masatoshi | |
| 5,703,642 A | 12/1997 | Stevens | |
| 5,898,168 A | 4/1999 | Gowda et al. | |
| 5,962,906 A | 10/1999 | Liu | |
| 5,965,875 A | 10/1999 | Merrill | |
| 5,999,279 A | 12/1999 | Kouzaki et al. |

(Continued)

FOREIGN PATENT DOCUMENTS

| | | |
|---|---|---|
| EP | 949 689 | 10/1999 |
| WO | 0062350 | 10/2000 |

OTHER PUBLICATIONS

Findlater et al. "A CMOS Imge Sensor With a Double-Junction Active Pixel".; IEEE Trns-on Electron Devices, vol. 50, No. 1, Jan. 2003, pp. 32-42.

(Continued)

*Primary Examiner* — Ngoc-Yen Vu
(74) *Attorney, Agent, or Firm* — Stolowitz Ford Cowger LLP

(57) ABSTRACT

An apparatus controls operation of an array of color multiple sensor pixel image sensors to provide a global shuttering for one half of the color multiple sensor pixel image sensors and a rolling shuttering for all color multiple sensor pixel image sensors of the array. The apparatus includes a row control circuit and a column clamp, sample, and hold circuit. The row control circuit generates the necessary reset control signals, transfer gating signals, and row selecting signals for providing the global shuttering and the rolling shuttering color multiple sensor pixel image sensors. The column clamp, sample and hold circuit generates an output signal representative of a number of photons impinging upon each color multiple sensor pixel image sensor of the row of selected color multiple sensor pixel image sensors. The control apparatus further includes an analog to digital converter which converts the read out signal to a digital image signal.

22 Claims, 11 Drawing Sheets